(12) United States Patent
Kimura et al.

(10) Patent No.: US 11,345,293 B2
(45) Date of Patent: May 31, 2022

(54) PROTECTOR AND WIRE HARNESS

(71) Applicant: Yazaki Corporation, Tokyo (JP)

(72) Inventors: Akitoshi Kimura, Aichi (JP); Michihito Suzuki, Aichi (JP); Takashi Kawaguchi, Aichi (JP); Hirotada Suyama, Aichi (JP); Akihito Futori, Aichi (JP); Kazuya Takahashi, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/930,260

(22) Filed: Jul. 15, 2020

(65) Prior Publication Data

US 2021/0016727 A1  Jan. 21, 2021

(30) Foreign Application Priority Data

Jul. 19, 2019 (JP) .............................. JP2019-133686

(51) Int. Cl.
*B60R 16/02* (2006.01)
*H01B 7/00* (2006.01)

(52) U.S. Cl.
CPC ....... *B60R 16/0215* (2013.01); *H01B 7/0045* (2013.01)

(58) Field of Classification Search
CPC .... B60R 16/0215; H01B 7/0045; H02G 3/04; H02G 3/0418
See application file for complete search history.

(56) References Cited

U.S. PATENT DOCUMENTS

| | | | |
|---|---|---|---|
| 4,951,716 A * | 8/1990 | Tsunoda | H02G 3/0418 138/157 |
| 7,581,564 B2 * | 9/2009 | Tanaka | H02G 3/06 138/110 |
| 10,236,618 B1 * | 3/2019 | Irish | H01R 13/516 |
| 10,490,986 B2 * | 11/2019 | Osada | H02G 3/0468 |
| 10,666,031 B1 * | 5/2020 | Steffka | H02G 3/14 |
| 2005/0217888 A1 * | 10/2005 | Arai | H02G 3/0418 174/72 A |

(Continued)

FOREIGN PATENT DOCUMENTS

DE  10 2005 055 169 A1  6/2006
JP  H11-168814 A  6/1999

(Continued)

*Primary Examiner* — Paresh Paghadal
(74) *Attorney, Agent, or Firm* — Kenealy Vaidya LLP

(57) ABSTRACT

A protector includes a protector main body, a lid member, a locking mechanism, and a pair of guide mechanisms. The locking mechanism has a locking hole formed in the lid member and opens on opposite sides in a height direction and a locking lug portion positioned at an end portion of an opposed wall portion on a side of an opening and that is locked to the locking hole. The locking mechanism locks the protector main body and the lid member to each other in a correct position. The guide mechanisms have guide chips positioned at opposite end portions in a width direction of the lid member and extending along the height direction and guide holes positioned at the end portions of the opposed wall portions on the side of the opening and into which the guide chips are respectively inserted along the height direction.

5 Claims, 13 Drawing Sheets

(56) References Cited

U.S. PATENT DOCUMENTS

| | | | |
|---|---|---|---|
| 2008/0200065 A1* | 8/2008 | Volpone | H01R 13/506 439/577 |
| 2009/0211781 A1* | 8/2009 | Suzuki | B60R 16/0215 174/101 |
| 2017/0331263 A1* | 11/2017 | Matsumura | H01B 7/0045 |
| 2018/0287355 A1* | 10/2018 | Nomura | H02G 3/0418 |
| 2019/0123530 A1* | 4/2019 | Tokuyama | H02G 3/0487 |
| 2019/0202381 A1* | 7/2019 | Steffka | H01R 9/2608 |

FOREIGN PATENT DOCUMENTS

| | | |
|---|---|---|
| JP | H11-299053 A | 10/1999 |
| JP | 2006-74843 A | 3/2006 |

\* cited by examiner

PROTECTOR AND WIRE HARNESS

CROSS-REFERENCE TO RELATED APPLICATION(S)

The present application claims priority to and incorporates by reference the entire contents of Japanese Patent Application No. 2019-133686 filed in Japan on Jul. 19, 2019.

BACKGROUND OF THE INVENTION

1. Field of the Invention

The present invention relates to a protector and a wire harness.

2. Description of the Related Art

As a conventional protector applied to a wire harness or the like for a vehicle, there is a protector disclosed in Japanese Patent Application Laid-open No. 2006-74843, for example, which includes a protector main body having a tub shape and a lid separate from the protector main body. At opposed positions of opposite side walls in a width direction of the protector main body, a large number of lock lug locking frames are formed in protruding manners at intervals in a length direction at the opposed positions on opposite sides along upper ends of outer faces of the side walls. At opposed positions in the width direction of the lid, a large number of lock chips having lock lugs at lower ends are formed in downward protruding manners at intervals along the length direction. The positions of the lock chips of the lid and the positions of the lock locking frames of the protector main body are opposed to each other.

The protector described in above-mentioned Japanese Patent Application Laid-open No. 2006-74843 is desired to have such a structure that the protector can be assembled more reliably, for example.

SUMMARY OF THE INVENTION

The present invention has been made with the above circumstances in view and its object is to provide a protector and a wire harness that can be assembled properly.

In order to achieve the above mentioned object, a protector according to one aspect of the present invention includes a protector main body including a base, paired opposed wall portions protruding from the base and opposed to each other along an opposed direction, a routing space that is formed by the base and the paired opposed wall portions and through which a wire is routed, and an opening that is formed by end portions of the paired opposed wall portions on an opposite side from the base and that opens on one side in a protruding direction of the opposed wall portions with respect to the base; a lid member that closes the opening; a locking mechanism including a locking hole that is formed in the lid member and opens on opposite sides in the protruding direction and a locking lug portion that is positioned at the end portion of the opposed wall portion on a side of the opening and that is locked to the locking hole, the locking mechanism locking the protector main body and the lid member to each other in a correct position where the lid member closes the opening; and paired guide mechanisms including paired guide chips respectively positioned at opposite end portions in the opposed direction of the lid member and extending along the protruding direction and paired guide holes that are respectively positioned at the end portions of the paired opposed wall portions on the side of the opening and into which the paired guide chips are respectively inserted along the protruding direction, wherein protruding amounts along the protruding direction of the pared guide chips are set such that the guide chips are inserted into the guide holes before the locking lug portion is locked to the locking hole.

According to another aspect of the present invention, in the protector, it is preferable that each of the paired guide holes is adjacent to the locking hole in an adjacent direction intersecting the protruding direction and the opposed direction when the lid member is disposed in the correct position for closing the opening.

According to still another aspect of the present invention, in the protector, it is preferable that each of the paired guide holes includes a plate-shaped portion extending along the adjacent direction intersecting the protruding direction and the opposed direction, a support portion that supports opposite end portions of the plate-shaped portion, and a guide space that is positioned between the opposed wall portion and the plate-shaped portion in the opposed direction and into which the guide chip is inserted, an inner face of the plate-shaped portion opposed to the opposed wall portion is inclined with respect to the protruding direction such that the guide space gradually widens from a side of the base toward the side of the opening, and a width along the opposed direction of the inclined inner face of one of the paired guide mechanisms is greater than a width alone the opposed direction of the inclined inner face of the other guide mechanism in the pared guide mechanisms.

In order to achieve the above mentioned object, a wire harness according to still another aspect of the present invention includes a wire having conductivity; and a protector that is mounted to the wire and protects the wire, wherein the protector includes a protector main body having a base, paired opposed wall portions protruding from the base and opposed to each other along an opposed direction, a routing space which is formed by the base and the paired opposed wall portions and through which the wire is routed, and an opening that is formed by end portions of the paired opposed wall portions on an opposite side from the base and that opens on one side in a protruding direction of the opposed wall portions with respect to the base, a lid member that closes the opening, a locking mechanism having a locking hole that is formed in the lid member and opens on opposite sides in the protruding direction and a locking lug portion that is positioned at the end portion of the opposed wall portion on a side of the opening and that is locked to the locking hole, the locking mechanism locking the protector main body and the lid member to each other in a correct position where the lid member closes the opening, and paired guide mechanisms having paired guide chips respectively positioned at opposite end portions in the opposed direction of the lid member and extending along the protruding direction and paired guide holes which are respectively positioned at the end portions of the paired opposed wall portions on the side of the opening and into which the paired guide chips are respectively inserted along the protruding direction, and protruding amounts along the protruding direction of the paired guide chips are set such that the guide chips are inserted into the guide holes before the locking lug portion is locked to the locking hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
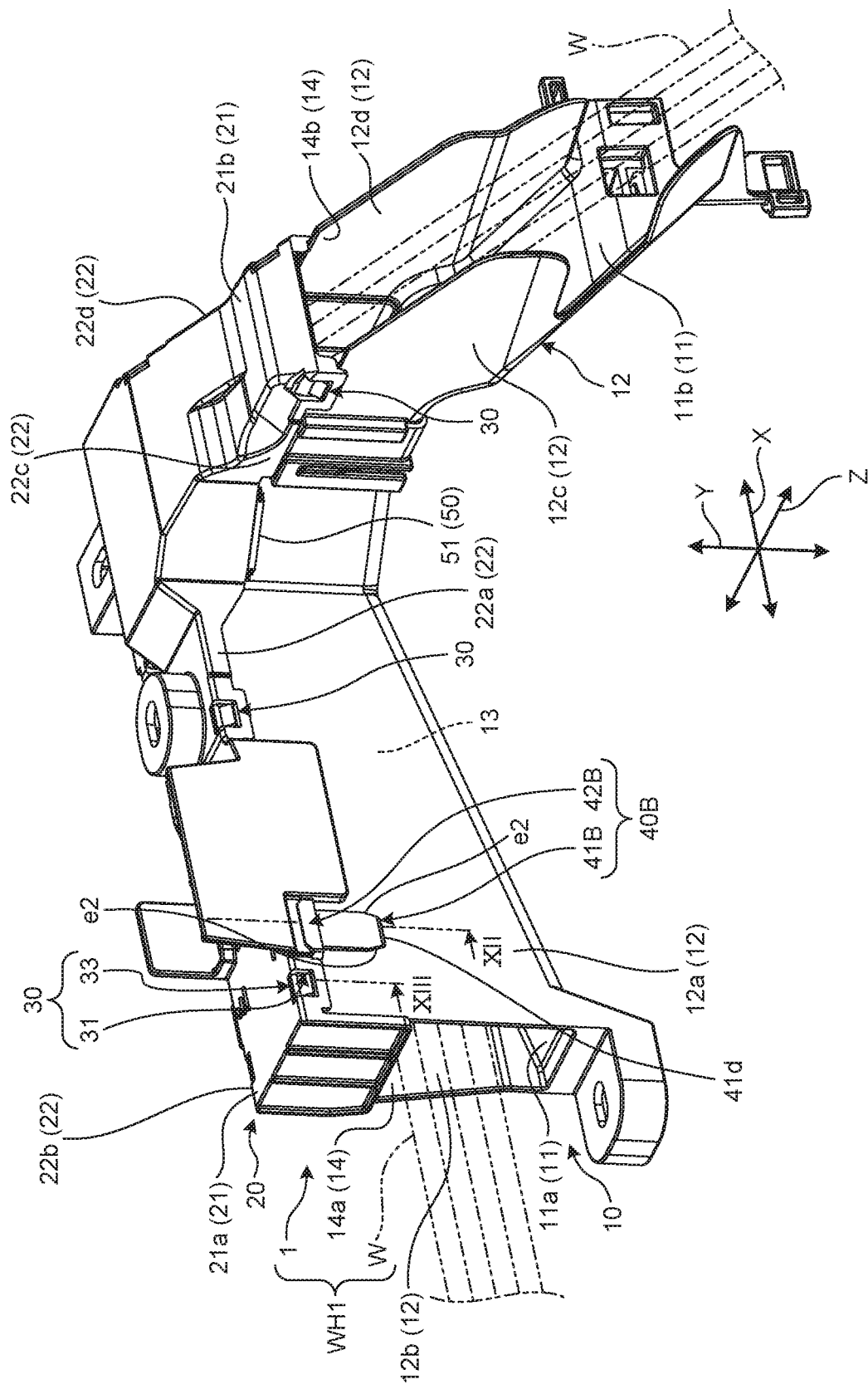
FIG. 1 is a perspective view of a protector according to an embodiment viewed from the front.

An embodiment according to the present invention will be described below in detail based on the drawings. The embodiment is not intended to limit the invention.

Wires W are shown by two-dot chain lines in FIGS. 1 and 2 described below and are not shown in the other figures. In the following description, out of a first direction, a second direction, and a third direction intersecting each other, the first direction will be referred to as an "axial direction X", the second direction will be referred to as a "height direction Y", and the third direction will be referred to as a "width direction Z". Here, the axial direction X, the height direction Y and the width direction Z are orthogonal to each other (intersecting each other). The height direction Y typically corresponds to a stacking direction in which a protector main body 10 and a lid member 20 are stacked, corresponds to a protruding direction in which opposed wall portions 12a, 12b, 12c, 12d protrude with respect to a base 11, and corresponds to a protruding direction in which lid side wall portions 22 protrude with respect to a lid portion 21. The width direction Z typically corresponds to an opposed direction in which the paired first opposed wall portions (paired opposed wall portions) 12a, 12b are opposed to each other and corresponds to an opposed direction in which paired first lid side wall portions 22a, 22b are opposed to each other. The axial direction X typically corresponds to a direction in which locking holes 31 and guide holes 42A, 42B are adjacent to each other and corresponds to a direction in which the paired first opposed wall portions 12a, 12b extend respectively. FIGS. 7, 10, 11, 8, 12, and 13 are sectional views in a plane including the height direction Y and the width direction Z (sectional views in a plane orthogonal to the axial direction X). The respective directions used in the following description are directions when respective portions of a protector 1 are assembled unless otherwise specified.

EMBODIMENT

Figure 2:
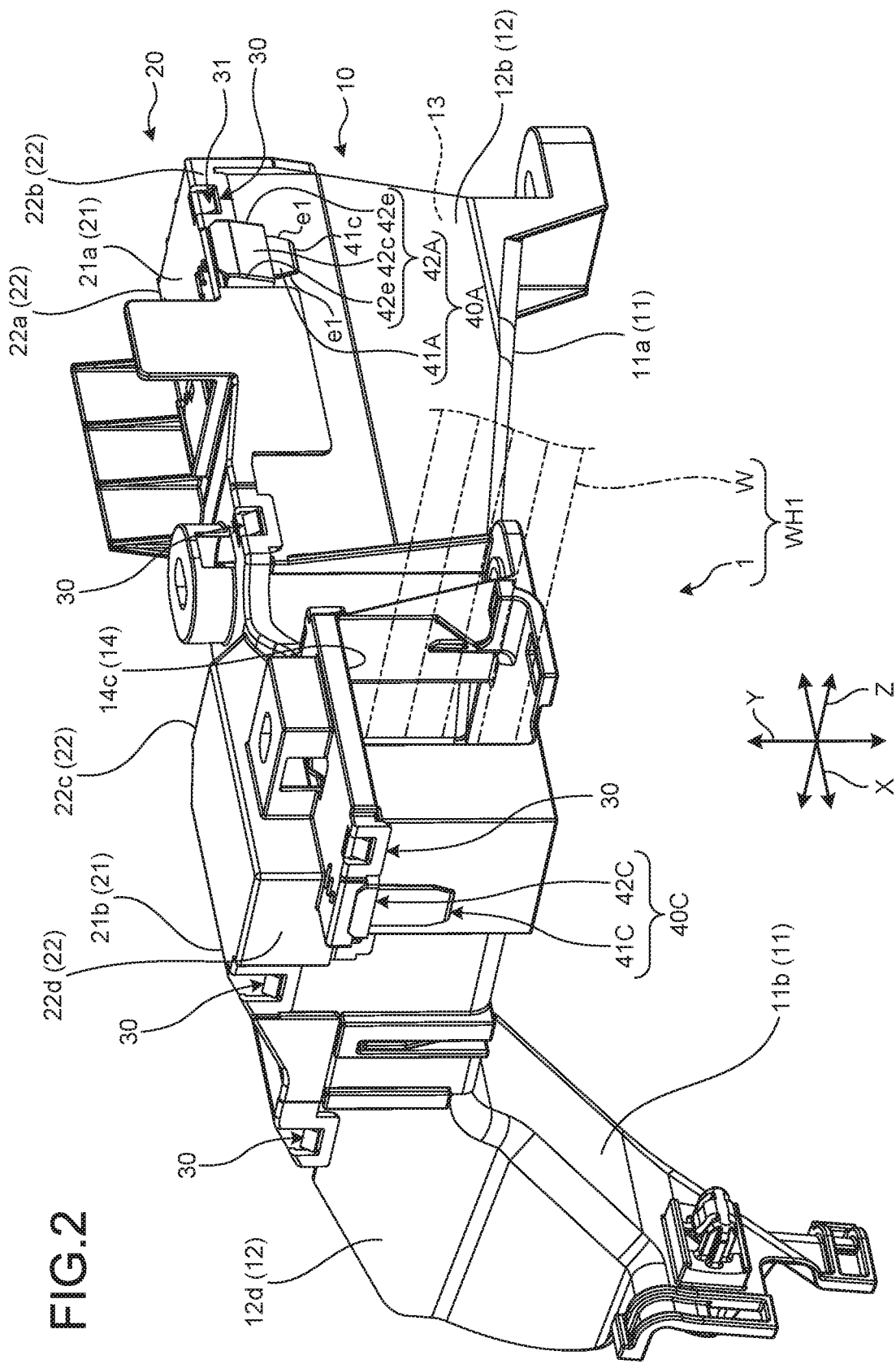
FIG. 2 is a perspective view of the protector according to the embodiment viewed from behind.
Figure 3:
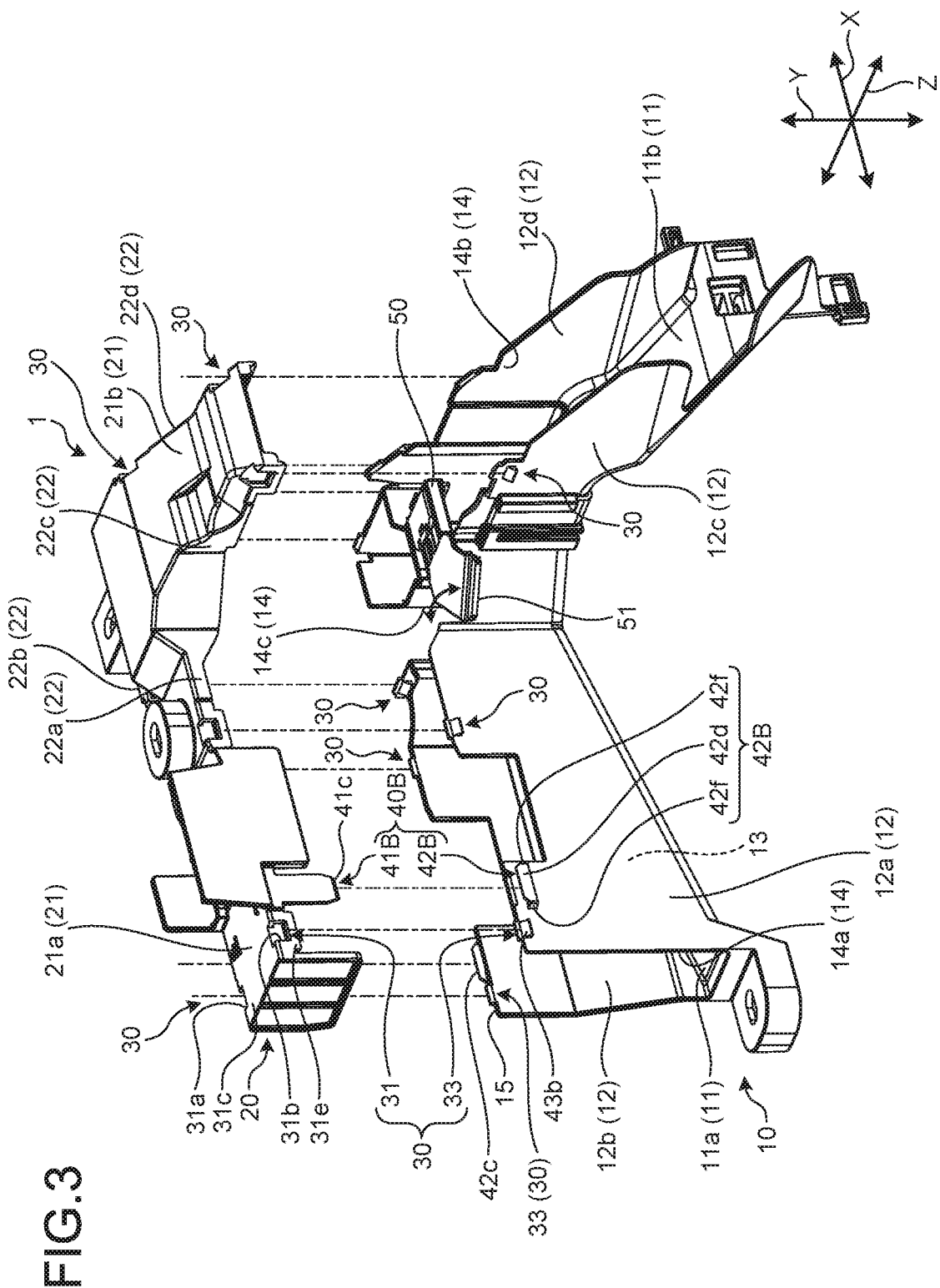
FIG. 3 is an exploded perspective view of the protector according to the embodiment.

The protector 1 according to the present embodiment and shown in FIGS. 1, 2, and 3 is mounted into a wire harness WH1 mounted to a vehicle such as an automobile and covers the wires W having conductivity to protect the wires W. For connection between respective devices mounted to the vehicle, for example, the wire harness WH1 is formed as a part assembly by binding the plurality of wires W used for power supply and signal communication such that the plurality of wires W are connected to the respective devices by use of connectors or the like. The wire harness WH1 includes the wires W having the conductivity and the protector 1 that is mounted to the wires W to protect the wires W. The wires W are formed by metal rods, electric wires, electric wire bundles, or the like, for example. The metal rods are rod-shaped members that have conductivity and are covered with sheaths, having insulation properties, from outside. The electric wires are conductors (cable cores) formed by a plurality of metal wires that have conductivity and are covered with sheaths, having insulation properties, from outside. The electric wire bundles are the electric wires that are bundled. The wire harness WH1 in the embodiment achieves a structure capable of properly assembling the protector 1 that is mounted to the wires W, by providing locking mechanisms 30 and paired guide mechanisms 40A, 40B to the protector 1. A structure of the protector 1 will be described below in detail with reference to the respective figures. The harness WH1 may also include an electric connection box, grommets, fixtures, connectors, and the like.

The protector 1 is made of resin material having an insulation property and formed in a substantially tubular shape. In the protector 1 according to the embodiment, the wires W are routed while bent in a substantially L shape. However, the wires W are not necessarily routed in this manner and may be routed straight. The protector 1 includes the protector main body 10, the lid member 20, the locking mechanisms 30, the pair of guide mechanisms 40A, 40B, and a cover 50. In the protector 1, the protector main body 10 and the lid member 20 are formed separately and mounted to each other by use of the locking mechanisms 30. The protector 1 is formed into the substantially L-shaped tubular shape as a whole by mounting of the protector main body 10 and the lid member 20 to each other. In the above-described structure, the protector 1 in the embodiment achieves the structure capable of properly mounting the lid member 20 to the protector main body 10 by use of the pair of guide mechanisms 40A, 40B. Here, the protector 1 further includes a guide mechanism 40C provided separately from the pair of guide mechanisms 40A, 40B. A structure of the protector 1 will be described below in detail with reference to the respective figures.

Through the protector main body 10, the wires W are inserted and routed. Here, the protector main body 10 is formed in a gutter shape open at one end portion in the axial direction X, opposite end portions in the width direction Z, and one end portion in the height direction Y. Through the protector main body 10, the wires W are inserted along the axial direction X and the width direction Z.

More specifically, the protector main body 10 has the base 11 and main body side wall portions 12. The protector main body 10 is formed to include the base 11, a routing space 13 formed by the main body side wall portions 12, insertion openings 14, and an opening/closing opening 15. The protector main body 10 is formed the shape of the substantially L-shaped tub as described above with the base 11 and the main body side wall portions 12 integrated with each other.

The base 11 is a bottom body for defining the routing space 13 as an inner space of the protector main body 10. The base 11 is formed in a substantially plate shape with a plate thickness direction oriented in the height direction Y. The base 11 has a first base (base) 11a extending in the axial direction X and a second base 11b extending in the width direction Z. The first base 11a has a predetermined width in the width direction Z for routing of the wires W. The second base 11b has a predetermined width in the axial direction X for routing of the wires W. The base 11 is formed in a substantially L shape with the first base 11a and the second base 11b formed integrally.

The main body side wall portions 12 are wall bodies for defining the routing space 13 as the inner space of the protector main body 10. The main body side wall portions 12 include the paired first opposed wall portions 12a, 12b (the paired opposed wall portions) opposed to each other and the paired second opposed wall portions 12c, 12d opposed to each other, the first and second opposed wall portions 12a, 12b, 12c, 12d formed to protrude along the height direction Y from the base 11.

Both of the paired first opposed wall portions 12a, 12b are formed in substantially plate shapes with plate thickness directions oriented in the width direction Z.

The respective first opposed wall portions 12a, 12b extend along the axial direction X and the height direction Y. The paired first opposed wall portions 12a, 12b are provided on opposite sides of the first base 11a in the width direction Z and positioned at an interval and opposed to each other along the width direction Z. Here, the paired first opposed wall portions 12a, 12b are respectively provided at opposite edges in the width direction Z of the first base 11a and extend from one end portion to the other end portion of the first base 11a along the axial direction X. In other words, the first base 11a is positioned between the paired first opposed wall portions 12a, 12b in the width direction Z and opposite end portions in the width direction Z of the first base 11a are connected to the first opposed wall portions 12a, 12b, respectively. The paired first opposed wall portions 12a, 12b stand on the same side in the height direction Y of the first base 11a. In the paired first opposed wall portions 12a, 12b, the one first opposed wall portion 12a and the other first opposed wall portion 12b have substantially equal lengths along the height direction Y and the other first opposed wall portion 12b has a greater length along the axial direction X than the one first opposed wall portion 12a.

Both of the paired second opposed wall portions 12c, 12d are formed in substantially plate shapes with plate thickness directions oriented in the axial direction X. The respective second opposed wall portions 12c, 12d extend along the width direction Z and the height direction Y. The paired second opposed wall portions 12c, 12d are provided on opposite sides of the second base 11b in the axial direction X and positioned at an interval and opposed to each other along the axial direction X. Here, the paired second opposed wall portions 12c, 12d are respectively provided at opposite edges in the axial direction X of the second base 11b and extend from one end portion to the other end portion of the second base 11b along the width direction Z. In other words, the second base 11b is positioned between the paired second opposed wall portions 12c, 12d in the axial direction X and opposite end portions in the axial direction X of the second base 11b are connected to the second opposed wall portions 12c, 12d, respectively. The paired second opposed wall portions 12c, 12d stand on the same side in the height direction Y of the second base 11b. In the paired second opposed wall portions 12c, 12d, the one second opposed wall portion 12c and the other second opposed wall portion 12d have substantially equal lengths along the height direction Y and the other second opposed wall portion 12d has a greater length along the width direction Z than the one second opposed wall portion 12c.

In the protector main body 10 formed as described above, the routing space 13, the plurality of insertion openings 14, and the opening/closing opening 15 are formed by the base 11 and the main body side wall portions 12. The routing space 13 is a space through which the wires W are routed along the axial direction X and the width direction Z. The routing space 13 is formed as the inner space surrounded with the base 11 and the main body side wall portions 12. The insertion openings 14 are openings through which the wires W are inserted into the routing space 13. The insertion openings 14 include a first insertion opening 14a formed at one end portion in the axial direction X by the paired first opposed wall portions 12a, 12b and the first base 11a. The first insertion opening 14a opens along the width direction Z and the height direction Y as shown in FIG. 1. The insertion openings 14 include a second insertion opening 14b and a third insertion opening 14c formed at opposite end portions in the width direction Z by the paired second opposed wall portions 12c, 12d and the second base 11b. The second insertion opening 14b is positioned at the one end portion in the width direction Z and opens along the axial direction X and the height direction Y. The third insertion opening 14c is positioned at the other end portion in the width direction Z and opens along the axial direction X and the height direction Y (see FIG. 2). As shown in FIG. 3, the opening/closing opening 15 is an opening that opens the routing space 13 to an outside and is the opening that is closed with the lid member 20. The opening/closing opening 15 is opened when the wires W are inserted through the routing space 13 and is closed with the lid member 20 after the wires W are inserted through the routing space 13, for example. The opening/closing opening 15 is formed by end portions of the respective opposed wall portions 12a, 12b, 12c, 12d on an opposite from the base 11. The opening/closing opening 15 is open on one side along the height direction Y of the respective opposed wall portions 12a, 12b, 12c, 12d, i.e., on the opposite side from the base 11.

The lid member 20 is mounted to the protector main body 10 to close (block) the opening/closing opening 15 formed in the protector main body 10. The lid member 20 has a lid portion 21 and lid side wall portions 22 as shown in FIGS. 1, 2, 3, and 4. The lid member 20 is formed in a shape of a substantially L-shaped plate corresponding to a shape of the protector main body 10 by the lid portion 21 and the lid side wall portions 22 integrated with each other.

The lid portion 21 is a lid body that closes the opening/closing opening 15 of the protector main body 10 and defines the routing space 13. The lid portion 21 is formed in a substantially plate shape with a plate thickness direction oriented in the height direction Y. The lid portion 21 has a first lid portion 21a opposed to the first base 11a in the height direction Y and extending in the axial direction X and a second lid portion 21b opposed to the second base 11b in the height direction Y and extending in the width direction Z. The first lid portion 21a has a predetermined width in the width direction Z so as to be able to close the routing space 13. The second lid portion 21b has a predetermined width in the axial direction X so as to be able to close the routing space 13. The lid portion 21 is formed in a substantially L shape with the first lid portion 21a and the second lid portion 21b formed integrally.

The lid side wall portions 22 are overlapping bodies that overlap the main body side wall portions 12 of the protector main body 10 and include paired first lid side wall portions 22a, 22b opposed to each other and paired second side wall portions opposed to each other.

The paired first lid side wall portions 22a, 22b are formed to protrude along the height direction Y from the first lid portion 21a. Here, both of the first lid side wall portions 22a, 22b are formed in substantially plate shapes with plate thickness directions oriented in the width direction Z. The paired first lid side wall portions 22a, 22b extend along the axial direction X and the height direction Y. The paired first lid side wall portions 22a, 22b are provided on opposite sides of the first lid portion 21a in the width direction Z and positioned at an interval and opposed to each other along the width direction Z. Here, the paired first lid side wall portions 22a, 22b are respectively provided at opposite edges in the width direction Z of the first lid portion 21a and extend from one end portion to the other end portion of the first lid portion 21a along the axial direction X. In other words, the first lid portion 21a is positioned between the paired first lid side wall portions 22a, 22b in the width direction Z and opposite end portions in the width direction Z of the first lid portion 21a are connected to the first lid side wall portions 22a, 22b, respectively. The paired first lid side wall portions 22a, 22b stand on the same side in the height direction Y of the first lid portion 21a. The first lid side wall portions 22a, 22b are formed to protrude toward the protector main body 10 along the height direction Y from the first lid portion 21a. In the pair of first lid side wall portions 22a, 22b, the one first lid side wall portion 22a and the other first lid side wall portion 22b have substantially equal lengths along the height direction Y and the other first lid side wall portion 22b has a greater length along the axial direction X than the one second lid side wall portion 22c.

The paired second lid side wall portions 22c, 22d are formed to protrude along the height direction Y from the second lid portion 21b. Here, both of the second lid side wall portions 22c, 22d are formed in substantially plate shapes with plate thickness directions oriented in the axial direction X. The paired second lid side wall portions 22c, 22d extend along the width direction Z and the height direction Y. The paired second lid side wall portions 22c, 22d are provided on opposite sides of the second lid portion 21b in the axial direction X and positioned at an interval and opposed to each other along the axial direction X. Here, the paired second lid side wall portions 22c, 22d are respectively provided at opposite edges in the axial direction X of the second lid portion 21b and extend from one end portion to the other end portion of the second lid portion 21b along the width direction Z. In other words, the second lid portion 21b is positioned between the paired second lid side wall portions 22c, 22d in the axial direction X and opposite end portions in the axial direction X of the second lid portion 21b are connected to the second lid side wall portions 22c, 22d, respectively. The paired second lid side wall portions 22c, 22d stand on the same side in the height direction Y of the second lid portion 21b. The second lid side wall portions 22c, 22d are formed to protrude toward the protector main body 10 along the height direction Y from the second lid portion 21b. In the pair of second lid side wall portions 22c, 22d, the one second lid side wall portion 22c and the other second lid side wall portion 22d have substantially equal lengths along the height direction Y and the other second lid side wall portion 22d has a greater length along the width direction Z than the one second lid side wall portion 22c.

Figure 4:
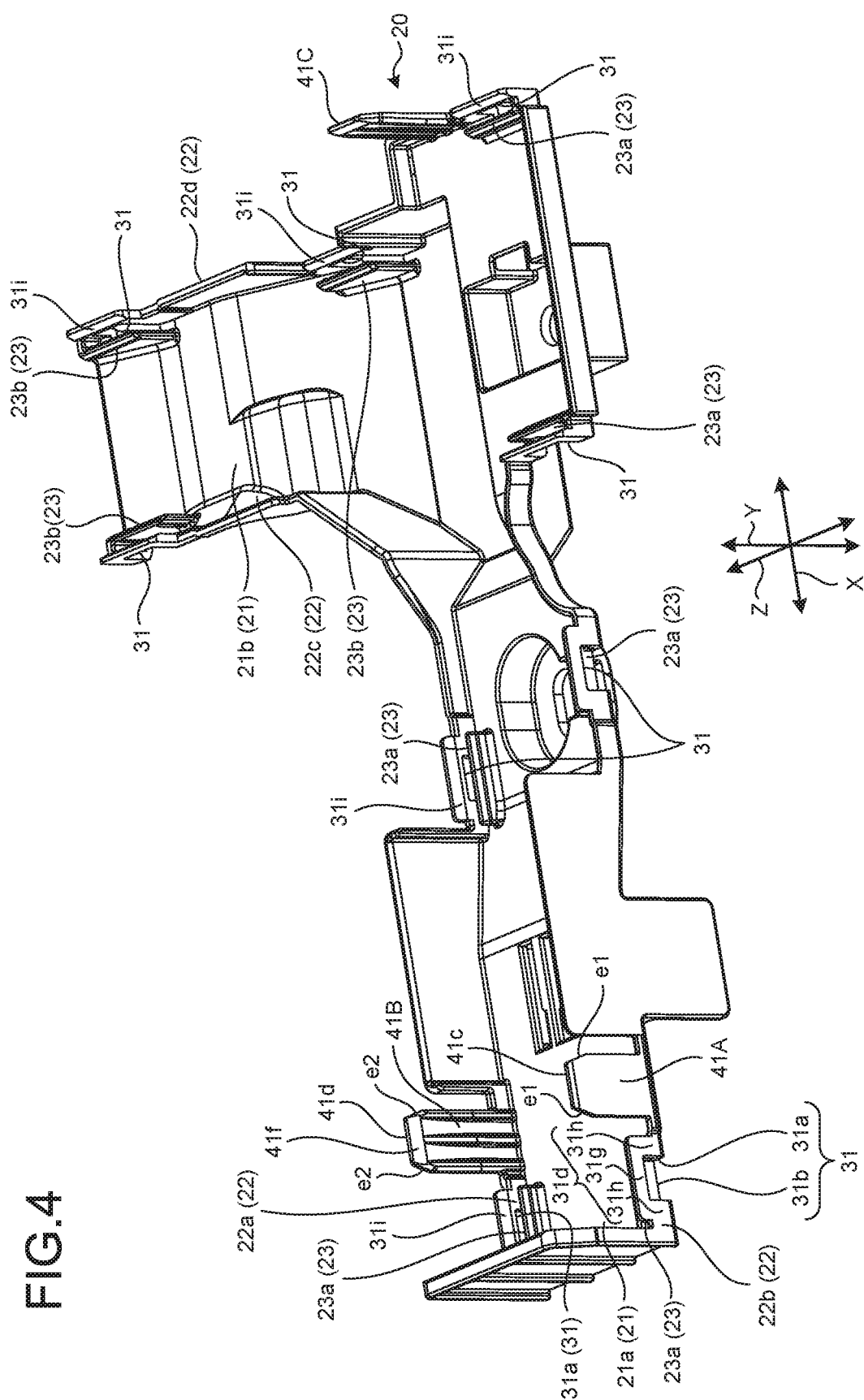
FIG. 4 is a perspective view of a lid member according to the embodiment viewed from the other side in a height direction.

As shown in FIG. 4, rib portions 23 are formed on the lid member 20. More specifically, first rib portions 23a are formed on the first lid portion 21a of the lid member 20 and second rib portions 23b are formed on the second lid portion 21b of the lid member 20. The first rib portions 23a are formed in rectangular plate shapes to be opposed, in the width direction Z, to side wall frame-shaped portions 31d and side wall through portions 31b formed by the side wall frame-shaped portions 31d (described later). The first rib portions 23a are disposed on a side of the routing space 13 between the paired first lid side wall portions 22a, 22b in the width direction Z. The second rib portions 23b are formed in rectangular plate shapes to be opposed, in the axial direction X, to the side wall frame-shaped portions 31d and the side wall through portions 31b formed by the side wall frame-shaped portions 31d. The second rib portions 23b are disposed on the side of the routing space 13 between the paired second lid side wall portions 22c, 22d in the axial direction X.

Figure 12:
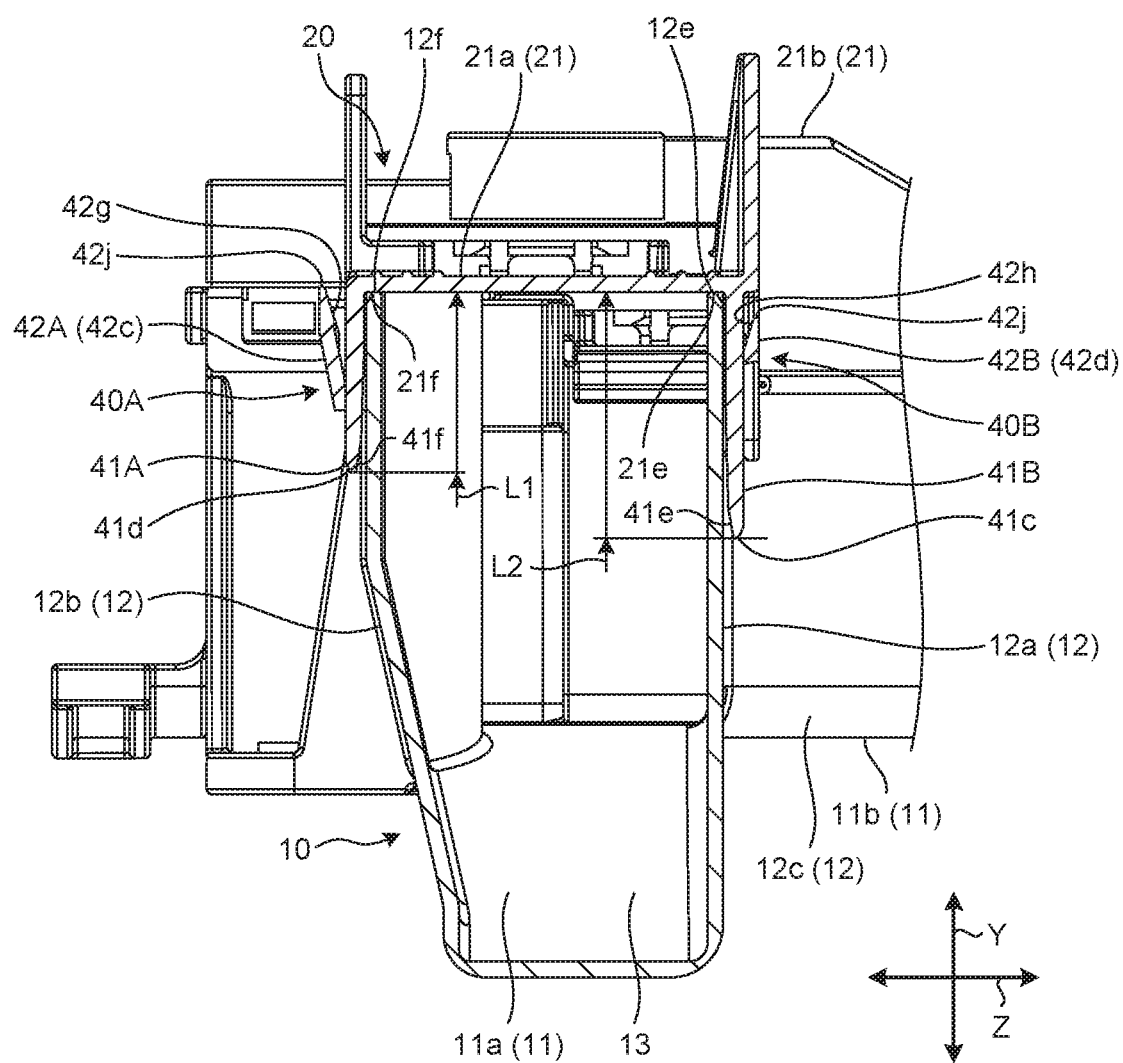
FIG. 12 is a sectional view taken in a direction of arrows XII-XII in FIG. 1.

As shown in FIGS. 1, 2, 12, and 13, the locking mechanisms 30 are mechanisms that lock the protector main body 10 and the lid member 20 to each other in a correct position where the lid member 20 closes (blocks) the opening/closing opening 15. Here, the correct position is such a position that the lid portion 21 of the lid member 20 closes the opening/closing opening 15 of the protector main body 10 and the main body side wall portions 12 and the lid side wall portions 22 are opposed to and overlap each other. When the protector 1 is in a closed state in which the lid member 20 is disposed in the correct position, the end portions 12e, 12f of the paired first opposed wall portions 12a, 12b on a side of the opening/closing opening 15 and contact portions 21e, 21f of the lid portion 21 positioned on the side of the routing space 13 come in contact with each other as shown in FIG. 12. When the lid member 20 is disposed in the correct position, the lid side wall portions 22 are positioned outside the main body side wall portions 12, i.e., positioned to be opposed to the main body side wall portions 12 on opposite sides from the routing space 13. More specifically, in the closed state, the first lid side wall portions 22a, 22b are positioned outside the first opposed wall portions 12a, 12b in the width direction Z and are opposed to and overlap the first opposed wall portions 12a, 12b along the width direction Z. In the closed state, the second lid side wall portions 22c, 22d are positioned outside the second opposed wall portions 12c, 12d in the axial direction X and are opposed to and overlap the second opposed wall portions 12c, 12d along the axial direction X.

The protector 1 in the embodiment has the nine locking mechanisms 30. Each of the locking mechanisms 30 has the same structure and includes the locking hole 31 and a locking lug portion 33. For convenience of explanation, in the present description, the locking holes 31 provided to the first lid portion 21a and the first lid side wall portions 22a, 22b will be described below and the locking holes 31 provided to the second lid portion 21b and the second lid side wall portions 22c, 22d will not be described. However, the former and the latter have the same structures. Similarly, in the present description, the locking lug portions 33 provided to the first opposed wall portions 12a, 12b will be described and the locking lug portions 33 provided to the second opposed wall portions 12c, 12d will not be described. However, the former and the latter have the same structures.

Each of the locking holes 31 is locked to each of the locking lug portions 33 in the closed state in which the protector main body 10 and the lid member 20 are in the correct position. Each of the locking holes 31 is formed in the lid member 20 to open on opposite sides in the height direction Y. The plurality of locking holes 31, the number of which corresponds to the number of the locking lug portions 33, are provided. Each of the locking holes 31 is formed at a position opposed to the locking lug portion 33 along the height direction Y.

Figure 5:
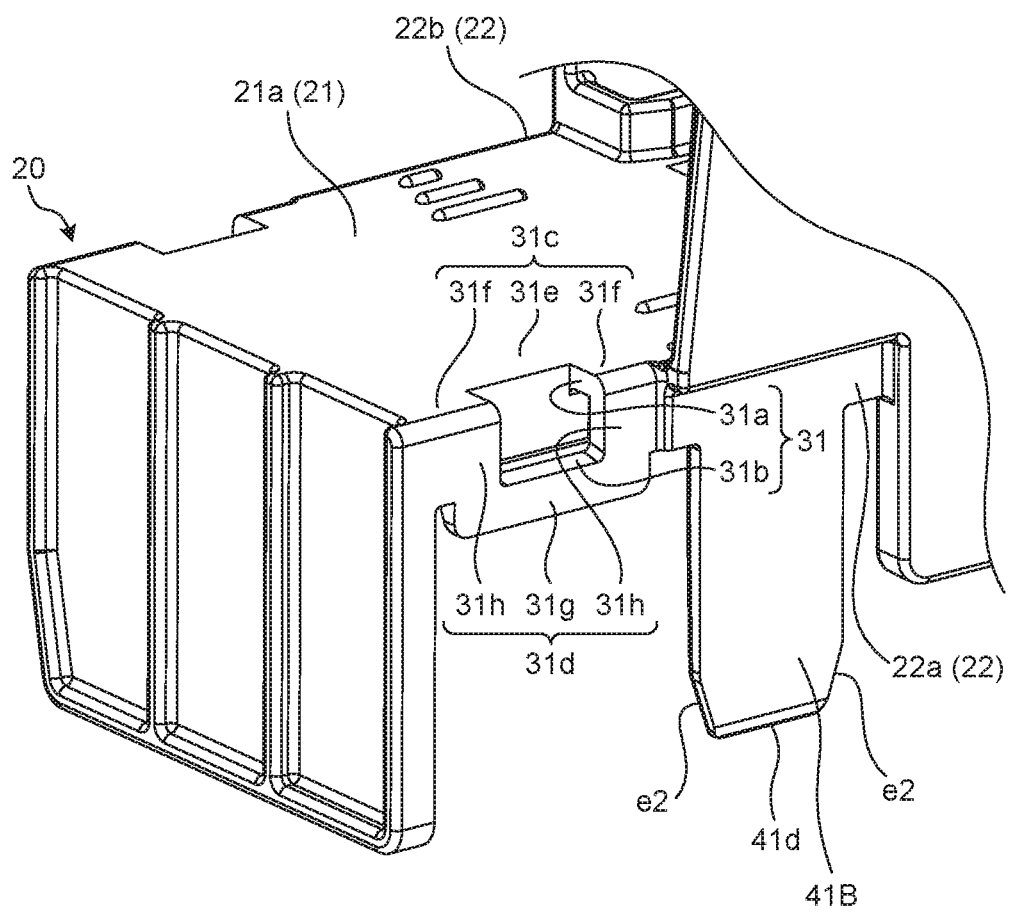
FIG. 5 is a perspective view of the lid member according to the embodiment from one side in the height direction.
Figure 5:
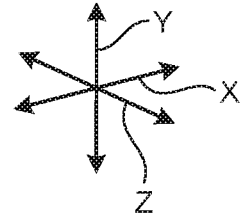

Each of the locking holes 31 is a through hole formed by a portion forming a part of the lid member 20 to extend astride the lid portion 21 and the lid side wall portion 22 as shown in FIGS. 4 and 5. Each of the locking holes 31 passes through the lid portion 21 and the lid side wall portion 22. In other words, each of the locking holes 31 is provided at an edge portion formed by intersection of the lid portion 21 and the lid side wall portion 22, passes through the lid portion 21 along the height direction Y, and passes through the lid side wall portion 22 along the width direction Z. Each of the locking holes 31 in the embodiment includes a lid through portion 31a and the side wall through portion 31b.

The lid through portion 31a is a portion of the locking hole 31 passing through the lid portion 21 along the height direction Y and is formed by a lid frame-shaped portion 31c forming a part of the first lid portion 21a. The lid frame-shaped portion 31c is formed into a C shape by a first portion 31e extending along the axial direction X and second portions 31f positioned at opposite end portions of the first portion 31e.

The side wall through portion 31b is a portion of the locking hole 31 passing through the lid side wall portion 22 along the width direction Z and is formed by the side wall frame-shaped portion 31d forming a part of the first lid side wall portion 22a. The side wall frame-shaped portion 31d is formed into a C shape by a third portion 31g extending along the axial direction X and fourth portions 31h supporting opposite end portions of the third portion 31g.

As S. 4 and 11, the third portions 31g of the side wall frame-shaped portions 31d of the paired locking mechanisms 30 opposed to each other have frame-shaped tapered portions 31i on tip end sides (on farther sides from the lid portion 21) of inner faces opposed to each other. Each of the frame-shaped tapered portions 31i is formed by a flat face inclined with respect to the height direction Y and the width direction Z. Each of the third portions 31g is formed to have a smaller thickness in the width direction Z on the farther side from the lid portion 21 than on a closer side to the lid portion 21 due to the frame-shaped tapered portion 31i.

Figure 6:
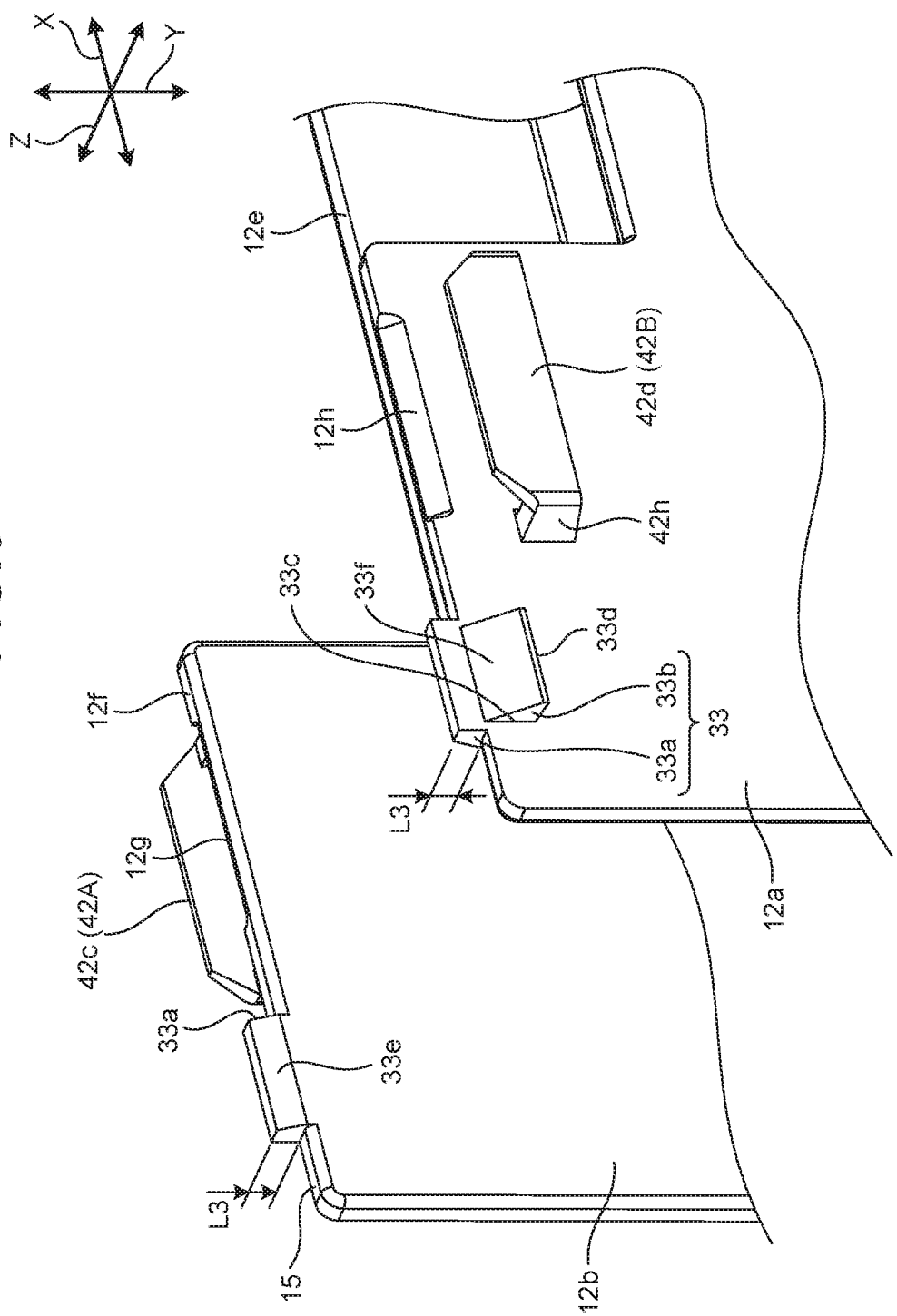
FIG. 6 is a perspective view of a pair of first opposed wall portions according to the embodiment viewed from the one side in the height direction.

As shown in FIG. 6, the respective locking lug portions 33 are positioned at end portions 12e, 12f of the first opposed wall portions 12a, 12b on the side of the opening/closing opening 15. Each of the locking lug portions 33 is locked to each of the locking holes 31 in the closed state in which the protector main body 10 and the lid member 20 are in the correct position. Each of the locking lug portions 33 is formed at a position opposed to the locking hole 31 along the height direction Y. Each of the locking lug portions 33 has a protruding chip 33a and a locking lug 33b.

The respective protruding chips 33a are formed to protrude in rectangular plate shapes in the height direction Y from the end portions 12e, 12f of the first opposed wall portions 12a, 12b on the side of the opening/closing opening 15.

The protruding chips 33a of the paired locking mechanisms 30 have protruding chip tapered portions 33e or opposed faces opposed to each other. Each of the protruding chip tapered portions 33e is formed by a flat face inclined with respect to the height direction Y and the width direction Z. The protruding chips 33a are formed to have smaller thicknesses in the width direction Z on farther sides from the end portions 12e, 12f of the first opposed wall portions 12a, 12b than on closer sides to the end portions 12e, 12f due to the protruding chip tapered portions 33e.

The locking lugs 33b are provided on outer face sides (opposite sides from the routing space 13) of the first opposed wall portions 12a, 12b. The respective locking lugs 33b are formed in lug shapes on the respective opposed wall portions 12a, 12b, 12c, 12d. To put it more concretely, the respective locking lug portions 33 are formed to protrude outward from the first opposed wall portions 12a, 12b. In the embodiment, each of the locking lug portions 33 has a base end portion 33c, a tip end portion 33d, and a locking lug tapered portion 33f. The base end portions 33c are positioned on the sides of the first opposed wall portions 12a, 12b. The tip end portion 33d protrudes toward an opposite side (a farther side from the routing space 13) in the width direction Z from the base end portion 33c. The locking lug tapered portion 33f is positioned on a closer side to the opening/closing opening 15 between the base end portion 33c and the tip end portion 33d. The locking lug tapered portion 33f is formed by a flat face inclined with respect to the height direction Y and the width direction Z. The locking lugs 33b are formed to have smaller thicknesses in the width direction Z on closer sides to the end portions 12e, 12f of the first opposed wall portions 12a, 12b on the side of the opening/closing opening 15 than on farther sides from the end portions 12e, 12f due to the locking lug tapered portions 33f.

In the correct position where the lid portion 21 closes the opening/closing opening 15, in each of the locking mechanisms 30 formed as described above, the locking lug portion 33 is locked to the locking hole 31 by insertion of the protruding chip 33a into the lid through portion 31a and insertion of the locking lug 33b into the side wall through portion 31b. Therefore, in the protector 1, the protector main body 10 and the lid member 20 can be locked to each other in the correct position by use of the locking mechanisms 30.

The paired guide mechanisms 40A, 40B are mechanisms that guide the lid member 20 toward the correct position of the protector main body 10 and guide the locking lug portions 33 toward the locking holes s31. The paired guide mechanisms 40A, 40B are provided on the outer face sides (the opposite sides from the routing space 13) of the first opposed wall portions 12a, 12b and have paired guide chips 41A, 41B and the paired guide holes 42A, 42B, respectively.

Figure 10:
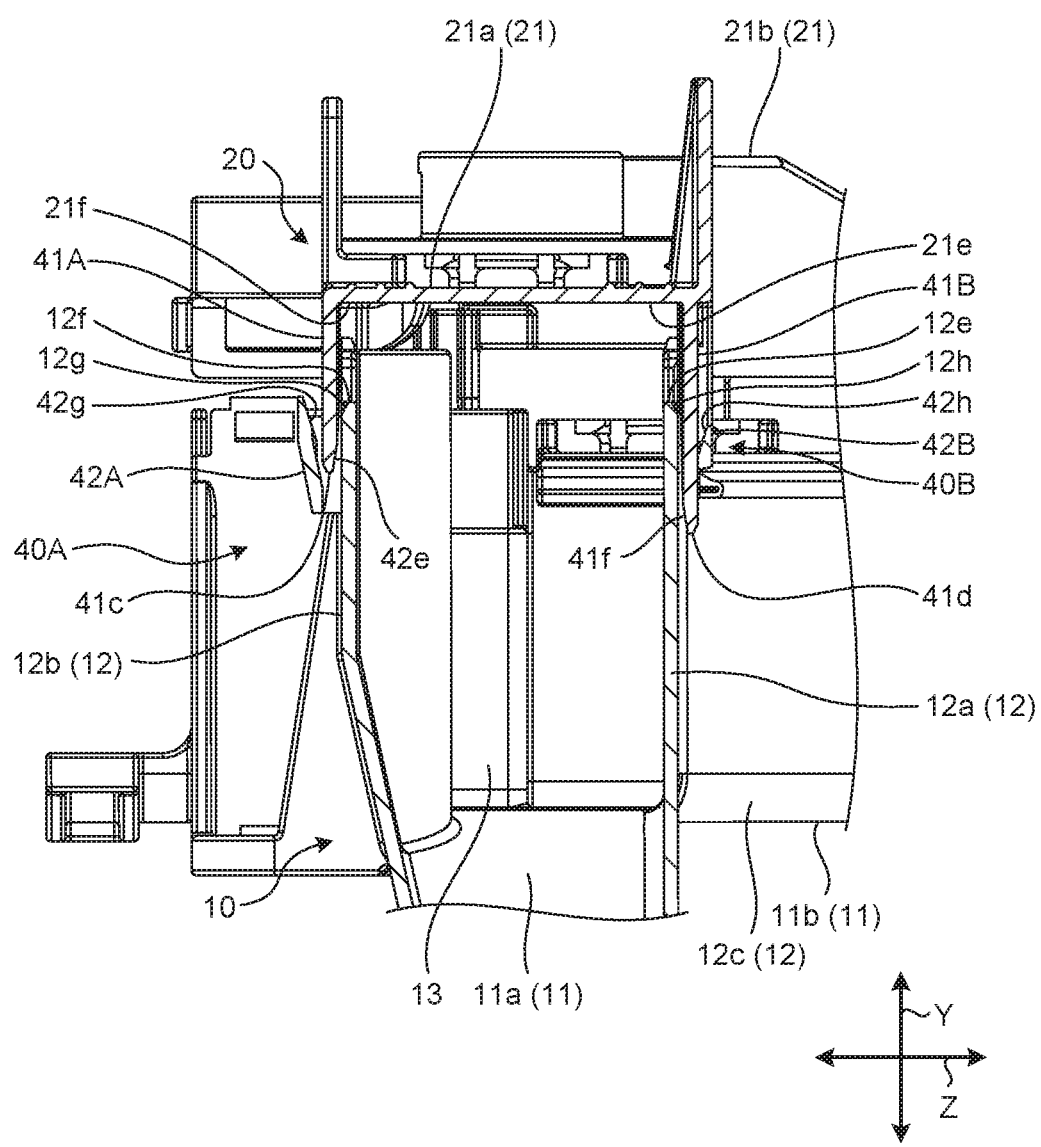
FIG. 10 is a sectional view taken in a direction of arrows IX-IX in FIG. 9.

As shown in FIGS. 4 and 10, the respective guide chips 41A, 41B are deposed at positions adjacent to the locking holes 31, positioned at opposite end portions in the width direction Z of the lid member 20, and extending along the height direction Y. More specifically, the respective guide chips 41A, 41B are extending in the height direction Y to thereby be inserted into the guide holes 42A, 42B before the locking lug portions 33 are locked to the locking holes 31. Here, both of the respective guide chips 41A, 41B are formed in substantially rectangular plate shapes with plate thickness directions oriented in the width direction Z and do not have locking lugs 33b unlike the locking lug portions 33.

To put it more concretely, respective faces of the respective guide chips 41A, 41B orthogonal to the width direction Z are flat and do not have portions protruding in the width direction Z except tip end portions 41c, 41d in the height direction Y.

The guide chips 41A, 41B have guide tapered portions 41e, 41f at the tip end portions 41c, 41d in the height direction Y. The guide tapered portions 41e, 41f are positioned on the inner faces of the paired guide chips 41A, 41B opposed to each other and formed by flat faces inclined with respect to the height direction Y and the width direction Z. The tip end portions 41c, 41d of the guide chips 41A, 41B are formed to have smaller thicknesses in the width direction Z on a farther side from the lid portion 21 than on a closer side to the lid portion 21 due to the guide tapered portions 41e, 41f. The tip end portions 41c, 41d in the height direction Y of the guide chips 41A, 41B are formed such that widths between opposite edges e1, e2 in the axial direction X gradually narrow toward tip end sides.

Out of protruding amounts L1, L2 of the paired guide chips 41A, 41B along the height direction Y from an inner face of the lid portion 21 on the side of the routing space 13 as shown in FIG. 12, the protruding amount L2 of the other guide chip 41B to the tip end portion 41d is greater than the protruding amount L1 of the one guide chip 41A to the tip end portion 41c. In the closed state of the protector 1, the end portions 12e, 12f of the first opposed wall portions 12a, 12b on the side of the opening/closing opening 15 are in contact with the contact portions 21e, 21f on the inner face of the lid portion 21 on the side of the routing space 13. The protruding amounts L1, L2 of the guide chips 41A, 41B along the height direction Y from the contact portions 21e, 21f are greater than protruding amounts L3 (see FIG. 6) of the locking lug portions 33 along the height direction Y from the end portions 12e, 12f of the first opposed wall portions 12a, 12b on the side of the opening/closing opening 15. Therefore, in assembly (described later) of the protector 1, the insertion of the guide chips 41A, 41B into the guide holes 42A, 42B is carried out before the locking of the locking lug portions 33 to the locking holes 31.

As shown in FIGS. 1, 2, and 3, the paired guide holes 42A, 42B are portions which are respectively positioned at the end portions 12e, 12f of the paired first opposed wall portions 12a, 12b on the side of the opening/closing opening 15, into which the paired guide chips 41A, 41B are respectively inserted along the height direction Y, and which open on opposite sides in the height direction Y. The paired guide holes 42A, 42B are positioned to be adjacent to the locking lug portions 33 in the axial direction X. The respective guide holes 42A, 42B are formed at positions opposed to the guide chips 41A, 41B along the height direction Y.

Figure 7:
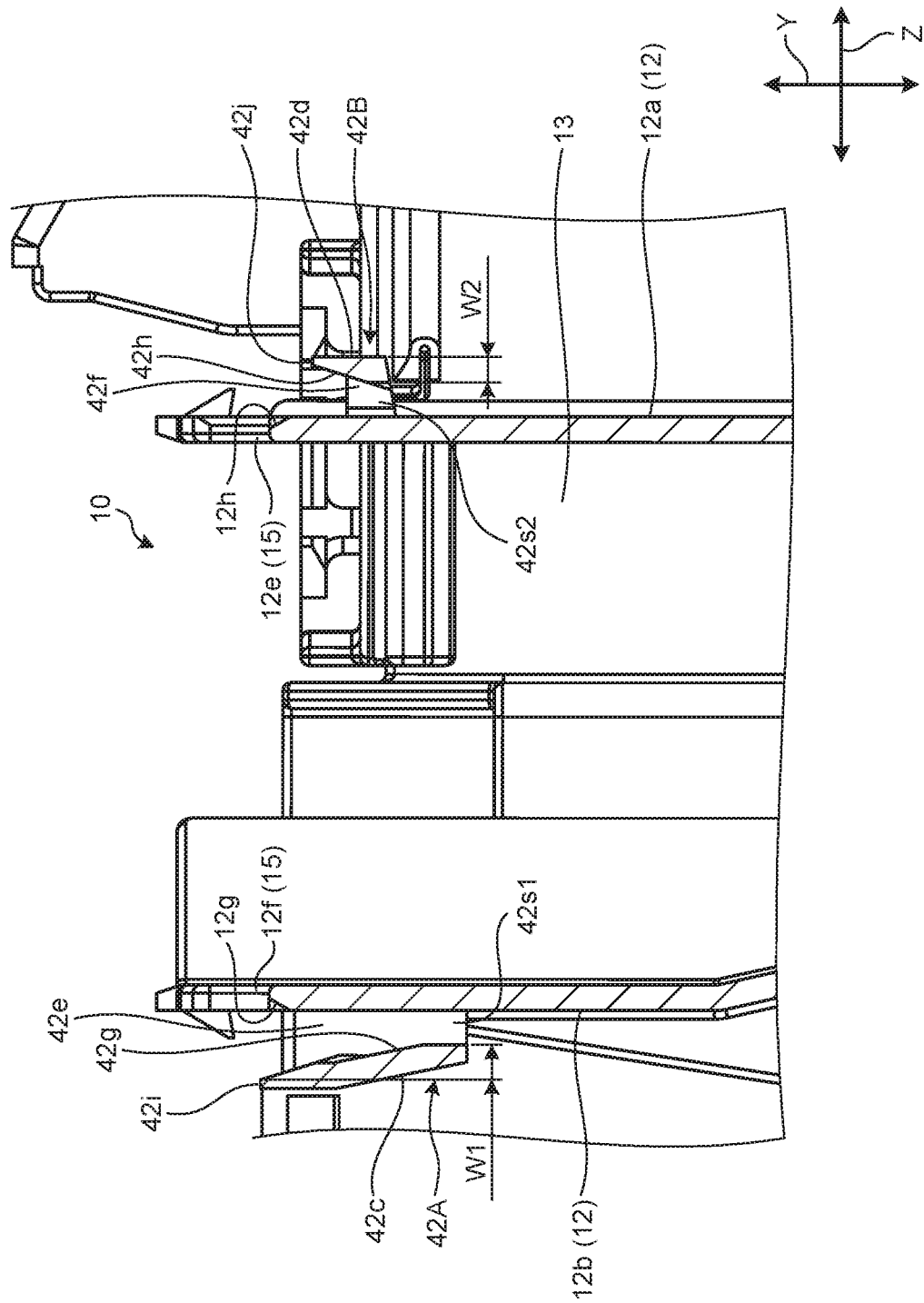
FIG. 7 is a sectional view of guide holes in a pair of guide mechanisms according to the embodiment.

As shown in FIG. 2, the one guide hole 42A includes a plate-shaped portion 42c, paired support portions 42e, and a guide space 42s1 (see FIG. 7). The plated-shaped portion 42c extends along the axial direction X. The paired support portions 42e support opposite end portions in the axial direction X of the plate-shaped portion 42c. As shown in FIG. 7, the guide space 42s1 is positioned between the first opposed wall portion 12b and the plate-shaped portion 42c in the width direction and the guide chip 41A is inserted into the guide space 42s1. An inner face 42g of the plate-shaped portion 42c opposed to the first opposed wall portion 12b is inclined with respect to the height direction Y and the width direction Z such that the guide space 42s1 gradually widens from a side of the first base 11a toward a side of the opening/closing opening 15. In other words, because the plate-shaped portion 42c is inclined with respect to the height direction Y and the width direction Z, the guide space 42s1 has a larger opening on the side of the opening/closing opening 15 than on the side of the first base 11a in the width direction Z.

As shown in FIG. 3, the other guide hole 42B includes a plate-shaped portion 42d, paired support portions 42f, and a guide space 42s2 (see FIG. 7). The plate-shaped portion 42d extends along the axial direction X. The paired support portions 42f support opposite end portions in the axial direction X of the plate-shaped portion 42d. As shown in FIG. 7, the guide space 42s2 is positioned between the first opposed wall portion 12a and the plate-shaped portion 42d in the width direction Z and the guide chip 41B is inserted into the guide space 42s2. An inner face 42h of the plate-shaped portion 42d opposed to the first opposed wall portion 12a is inclined with respect to the height direction Y and the width direction Z such that the guide space 42s2 gradually widens from a side of the first base 11a toward a side of the opening/closing opening 15. In other words, because the plate-shaped portion 42d is inclined with respect to the height direction Y and the width direction Z, the guide space 42s2 has a larger opening on the side of the opening/closing opening 15 than on the side of the first base 11a in the width direction Z.

In the paired guide mechanisms 40A, 40B, a width w1 along the width direction Z of the inclined inner face 42g of the one guide mechanism 40A is greater than a width w2 along the width direction Z of the inclined inner face 42h of the other guide mechanism 40B. An end portion 42i of the plate-shaped portion 42d of the one guide hole 42A on a side from which the guide chip 41A is inserted is disposed closer to the opening/closing opening 15 than an end portion 42j of the plate-shaped portion 42c of the other guide hole 42B on a side from which the guide chip 41B is inserted.

As shown in FIGS. 6 and 7, the end portion 12f, on the side of the opening/closing opening 15, of the first opposed wall portion 12b on which the one wide hole 42A is disposed is provided with an opposed wall tapered portion 12g. The opposed wall tapered portion 12g is positioned on the outer face positioned on an opposite side from inner faces of the paired first opposed wall portions 12a, 12b opposed to each other and formed by a flat face inclined with respect to the height direction Y and the width direction Z. In the height direction Y, the first opposed wall portion 12b is formed to have a smaller thickness in the width direction Z on a farther side from the first base 11a than on a closer side to the first base 11a due to the opposed wall tapered portion 12g.

The end portion 12e, on the side of the opening/closing opening 15, of the first opposed wall portion 12a on which the other guide hole 42B is disposed is provided with an opposed wall tapered portion 12h. The opposed wall tapered portion 12h is positioned on the outer face positioned on an opposite side from the inner faces of the paired first opposed wall portions 12a, 12b opposed to each other and formed by a flat face inclined with respect to the height direction Y and the width direction Z. In the height direction Y, the first opposed wall portion 12a is formed to have a smaller thickness in the width direction Z on a farther side from the first base 11a than on a closer side to the first base 11a due to the opposed wall tapered portion 12h.

As shown in FIGS. 1 and 2, the paired guide holes 42A, 42B are respectively adjacent to the locking holes 31 in the axial direction X in the closed state in which the lid member 20 is disposed in the correct position for closing the opening/closing opening 15. More specifically, the paired guide holes 42A, 42B and the locking holes 31 are disposed as close as possible to each other without contact between the side wall frame-shaped portions 31d of the locking holes 31 and the support portions 42e, 42f of the guide holes 42A, 42B in the closed state.

Here, the protector 1 further includes the guide mechanism 40C provided separately from the guide mechanisms 40A, 40B. The guide mechanism 40C has the same structure as the guide mechanism 40B but is disposed differently with respect to the protector 1. To put it more concretely, the guide mechanism 40C has a guide chip 41C provided to the second side wall portion 22d and extending along the height direction Y and a guide hole 42C provided at an end portion of the second opposed wall portion 12d on the side of the opening/closing opening 15 as shown in FIG. 2. Because a structure of the guide chip 41C is the same as a structure of the guide chip 41B and a structure of the guide hole 42C is the same as a structure of the guide hole 42B, the structures of the guide chip 41C and the guide hole 42C will not be described.

The cover 50 shown in FIG. 3 restricts lifting of the wires W from the routing space 13 after the wires W are routed through the routing space 13 and before the lid member 20 is disposed in the correct position of the protector main body 10. The cover 50 is made of resin material having an insulation property and formed in a plate shape extending in the axial direction X and the width direction Z. The cover 50 is mounted to the second opposed wall portion 12c by a hinge 51 and integrally supported on the protector main body 10.

In the protector 1 formed as described above, the lid member 20 is mounted to the protector main body 10 and the lid member 20 is properly mounted to the protector main body 10 as shown in FIGS. 3, 9, 10, 11, 12, and 13.

First, a worker turns the cover 50 about the hinge 51 with respect to the protector main body 10 shown in FIG. 3 and then, disposes the wires W in the routing space 13 of the protector main body 10. Next, the worker turns the cover 50 about the hinge 51 to thereby restrict the lifting of the wires W from the routing space 13 with the cover 50.

Then, while leaving a space between the base 11 of the protector main body 10 and the lid portion 21 of the lid member 20, the worker opposes the first base 11a and the first lid portion 21a to each other and opposes the second base 11b and the second lid portion 21h to each other in the height direction Y. Then, the worker brings the lid portion 21 of the lid member 20 close to the base 11 of the protector main body 10 in the height direction Y.

When the lid member 20 comes close to the protector main body 10, the tip end portions 41c, 41d of the paired guide chips 41A, 41B come close to the end portions 12e, 12f of the paired first opposed wall portions 12a, 12b. If the lid member 20 is brought close to the protector main body 10 when the lid member 20 is displaced in the width direction Z from the correct position with respect to the protector main body 10 on one side in the height direction Y of the correct position, for example, the guide tapered portions 11e, 41f shown in FIG. 8 come in contact with the opposed wall tapered portions 12g, 12h. As a result of the contact between the guide tapered portions 41e, 41f and the opposed wall tapered portions 12g, 12h, the respective paired guide chips 41A, 41B are disposed on the outer face sides of the first opposed wall portions 12a, 12b. On the other hand, if the lid member 20 is brought close to the protector main body 10 when the lid member 20 is aligned with the correct position with respect to the protector main body 10 on the one side in the height direction Y of the correct position, the guide tapered portions 41e, 41f and the opposed wall tapered portions 12g, 12h do not come in contact with each other.

As described above, the inner faces 42g, 42h of the plate-shaped portions 42c, 42d of the paired guide holes 42A, 42B are inclined with respect to the height direction Y and the width direction Z. Therefore, if the lid member 20 is brought close to the protector main body 10 when the lid member 20 is displaced in the width direction Z from the correct position with respect to the protector main body 10 on the one side in the height direction Y of the correct position, the guide tapered portions 41e, 41f come in contact with the inner faces 42g, 42h. As a result of the contact between the guide tapered portions 41e, 41f and the inner faces 42g, 42h, the respective tip end portions 41c, 41d of the paired guide chips 41A, 41B are inserted into the respective paired guide holes 42A, 42B. On the other hand, if the lid member 20 is brought close to the protector main body 10 when the lid member 20 is aligned with the correct position with respect to the protector main body 10 on the one side in the height direction Y of the correct position, the guide tapered portions 41e, 41f and the inner faces 42g, 42h do not come in contact with each other.

Figure 9:
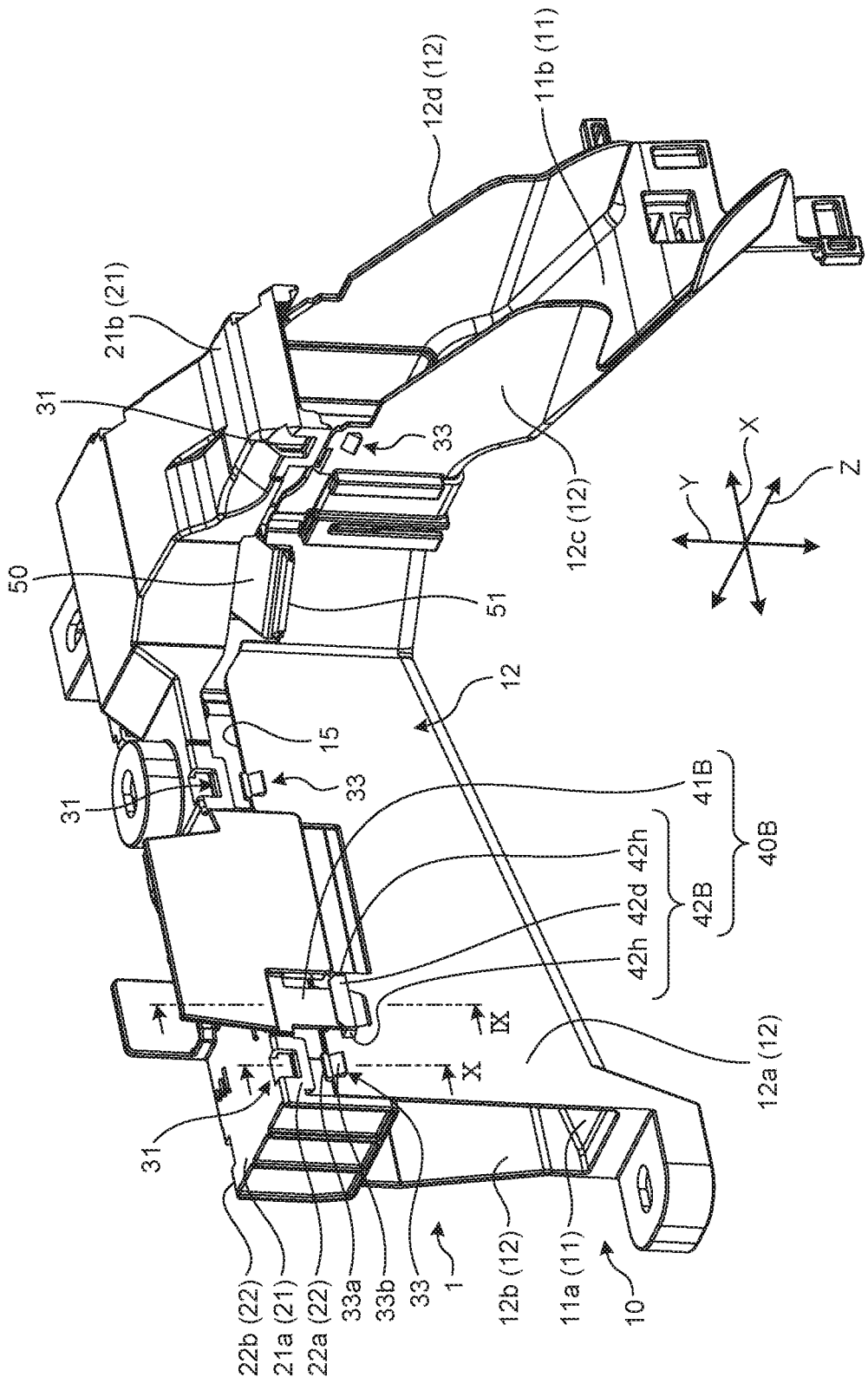
FIG. 9 is a perspective view of the protector according to the embodiment with guide chips and the guide holes of the guide mechanisms locked to each other and locking holes and locking recognition chips of the locking mechanisms not locked to each other.
Figure 11:
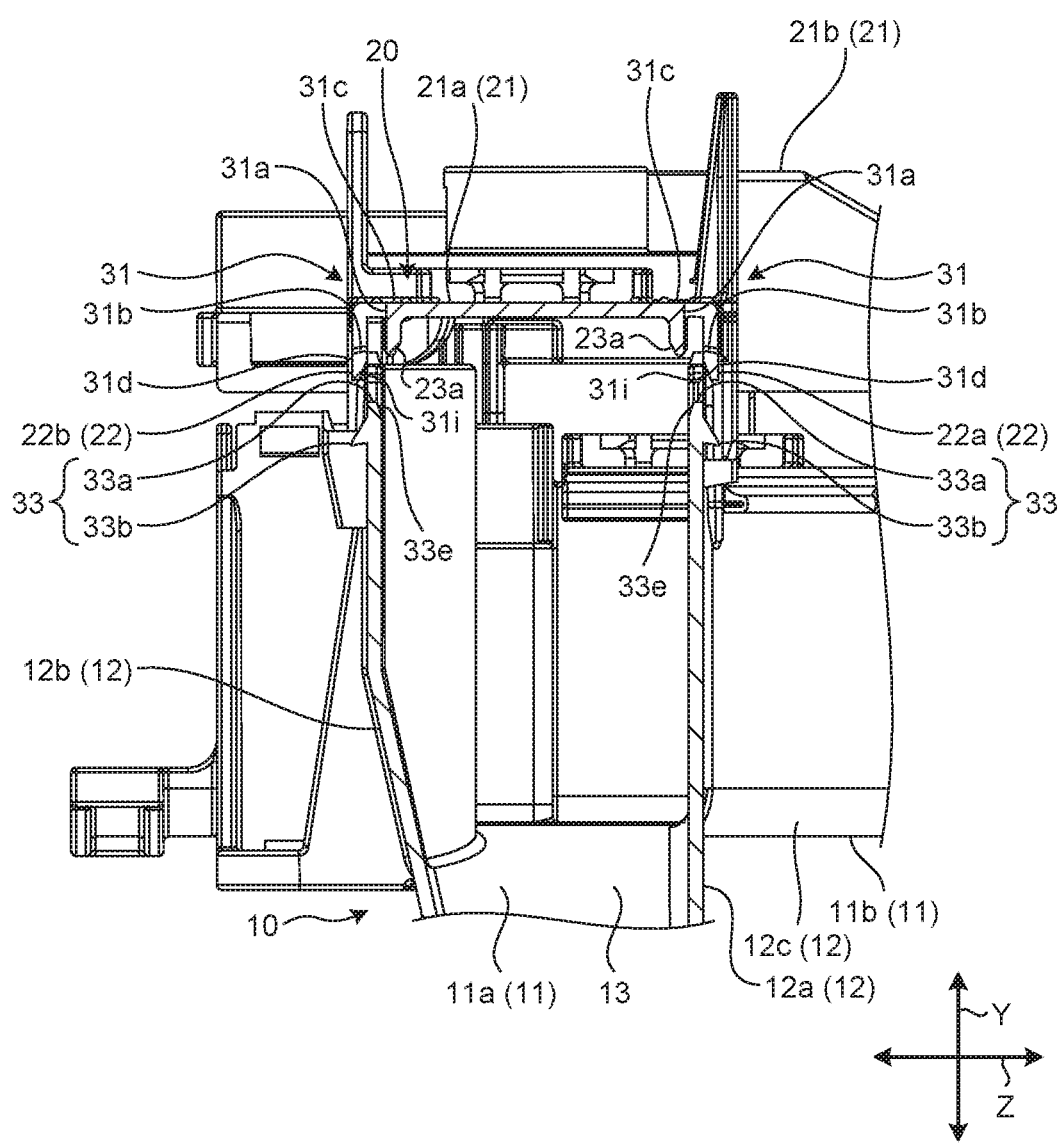
FIG. 11 is a sectional view taken in a direction of arrows X-X in FIG. 9.

As described above, if the worker brings the lid member 20 close to the protector main body 10, the tip end portions 41c, 41d of the paired guide chips 41A, 41B are respectively inserted into the paired guide holes 42A, 42B as shown in FIGS. 9 and 10. If the worker inserts the guide chip 41B into the guide hole 42B in the guide mechanism 40B, the guide chip 41C is inserted into the guide hole 42C in the guide mechanism 40C. In this state, however, a space exists in the height direction Y between each of the locking lug portions 33 and each of the locking holes 31 and each of the locking lug portions 33 is not locked to each of the locking holes 31 as shown in FIGS. 9 and 11. In other words, in the protector 1, the insertion of the paired guide chips 11A, 41B into the paired guide holes 42A, 42B (the insertion in the guide mechanisms 40A, 40B) is carried out before the locking of the locking lug portions 33 to the locking holes 31.

In the protector 1 in the embodiment, the insertion in the one guide mechanism 40A and the insertion in the other guide mechanism 40B may be carried out simultaneously or the insertion in the other guide mechanism 40B may be carried out first and then the insertion in the one guide mechanism 40A may be carried out. An assembly method by which the worker carries out the insertion in the other guide mechanism 40B first in the paired guide mechanisms 40A, 40B will be described below.

Figure 8:
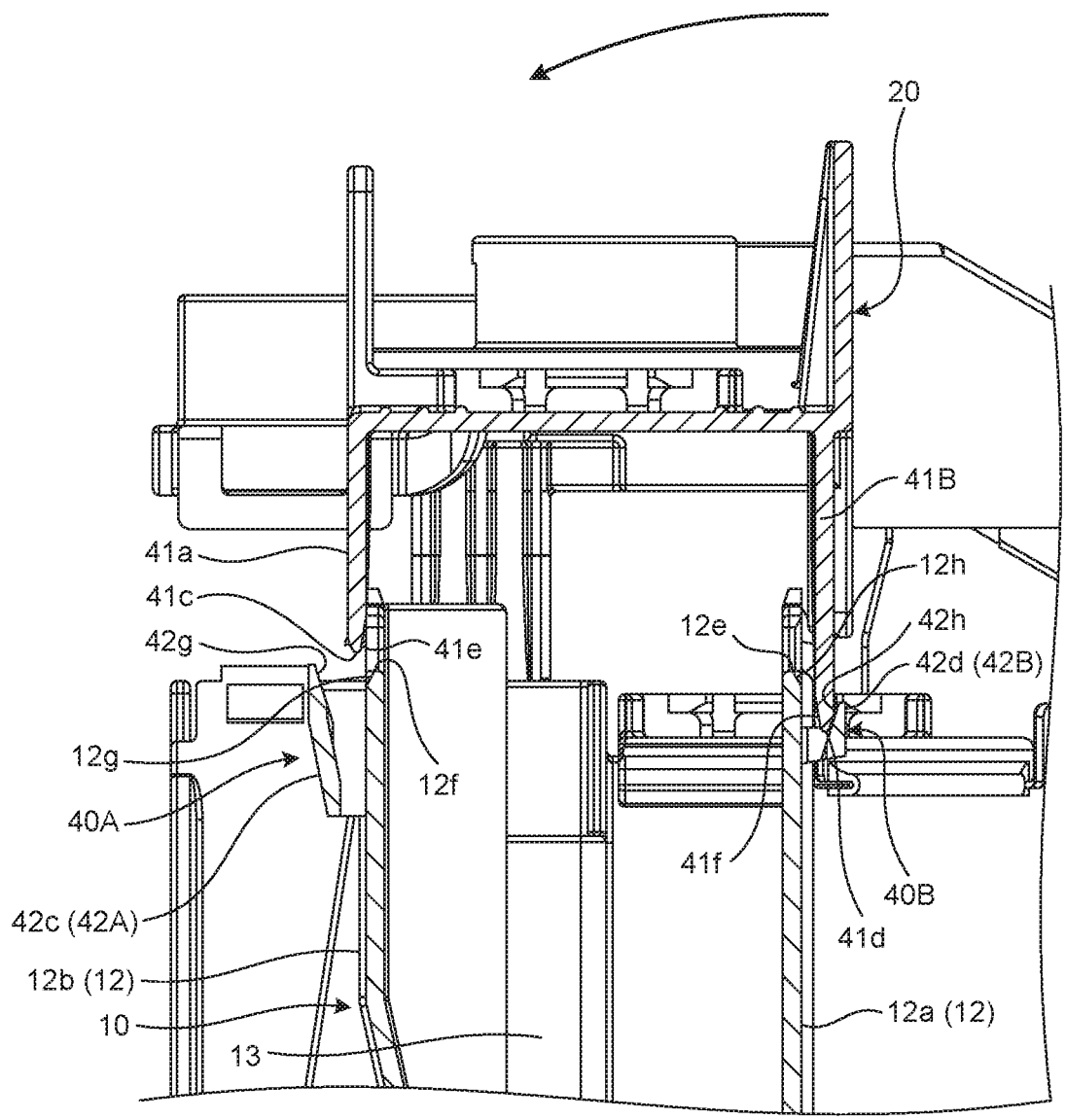
FIG. 8 is a sectional view of the pair of guide mechanisms and illustrating insertion of one of the guide mechanisms after insertion of the other of the guide mechanisms.
Figure 8:
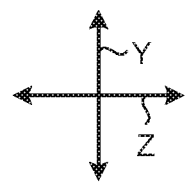

In the protector 1, as shown in FIG. 12, the protruding amount L2 from the inner face of the lid portion 21 on the side of the routing space 13 to the tip end portion 41c of the other guide chip 41B along the height direction Y is greater than the protruding amount L1 to the tip end portion 41d of the one guide chip 41A. Therefore, if the operator brings the lid member 20 close to the protector main body 10, the tip end portion 41d of the other guide chip 41E first comes in contact with the inner face 42h of the other guide hole 42B in the other guide mechanism 40B as shown in FIG. 8. In this state, the worker turns the lid member 20 about the top end portion 41d of the guide chip 41B (turns the lid member 20 in a direction of an arrow in FIG. 8). Then, in the protector 1, the tip end portion 41c of the guide chip 41A in the one guide mechanism 40A comes in contact with the inner face 42g of the one guide hole 42A. In the protector 1, in the above-described operation, the width W1 along the width direction Z of the inclined inner face 42g of the one guide mechanism 40A as shown in FIG. 7 is greater than the width W2 along the width direction Z of the inclined inner face 42$h$ of the other guide mechanism 40B. Therefore, in the protector 1, even if the tip end portion 41$d$ is slightly displaced from the inner face 42$h$ during the turning of the lid member 20 about the tip end portion 41$d$ of the other guide chip 41B, it is possible to insert the tip end portion 41$c$ of the one guide chip 41A into the guide hole 42A as shown in FIG. 8. Therefore, in the protector 1 in the embodiment, it is possible to facilitate the insertion of the one guide chip 41A into the one guide hole 42A. In the protector 1, the end portion 42$i$ of the plate-shaped portion 42$c$ of the one guide hole 42A on the side from which the guide chip 41A is inserted is disposed closer to the opening closing opening 15 than the end portion 42$j$ of the plate-shaped portion 42$d$ of the other guide hole 42B on the side from which the guide chip 41B inserted. Therefore, in the protector 1, it is possible to minimize a length of the turning of the lid member 20 in a circumferential direction about the tip end portion 41$d$ of the other guide chip 41B in the other guide mechanism 40B. As a result, in the protector 1, it is possible to further facilitate the insertion of the one guide chip 41A into the one guide hole 42A.

Then, the worker further brings the lid portion 21 of the lid member 20 close to the base 11 of the protector main body 10. When the lid member 20 comes close to the protector main body 10, the locking lug portions 33 come close to the locking holes 31 from the other side in the height direction Y. To put it concretely, the protruding chips 33$a$ of the locking lug portions 33 shown in FIG. 11 come close to the side wall frame-shaped portions 31$d$ of the locking holes 31 and the first rib portions 23$a$. If the lid member 20 is brought close to the protector main body 10 when the lid member 20 is displaced in the width direction Z from the correct position with respect to the protector main body 10 on the one side in the height direction Y of the correct position, the protruding chips 33$a$ come in contact with the frame-shaped tapered portions 31$i$ of the side wall frame-shaped portions 31$d$. Then, by the contact between the protruding chips 33$a$ and the frame shaped tapered portions 31$i$, the first opposed wall portions 12$a$, 12$b$ are guided into between the paired first lid side wall portions 22$a$, 22$b$. Then, the protruding chip tapered portions 33$e$ of the protruding chips 33$a$ come in contact with the rib portions 23. As a result of the contact between the protruding chip tapered portions 33$e$ and the rib portions 23, each of the protruding chips 33$a$ is disposed between the rib portion 23 and the side wall frame-shaped portion 31$d$.

Figure 13:
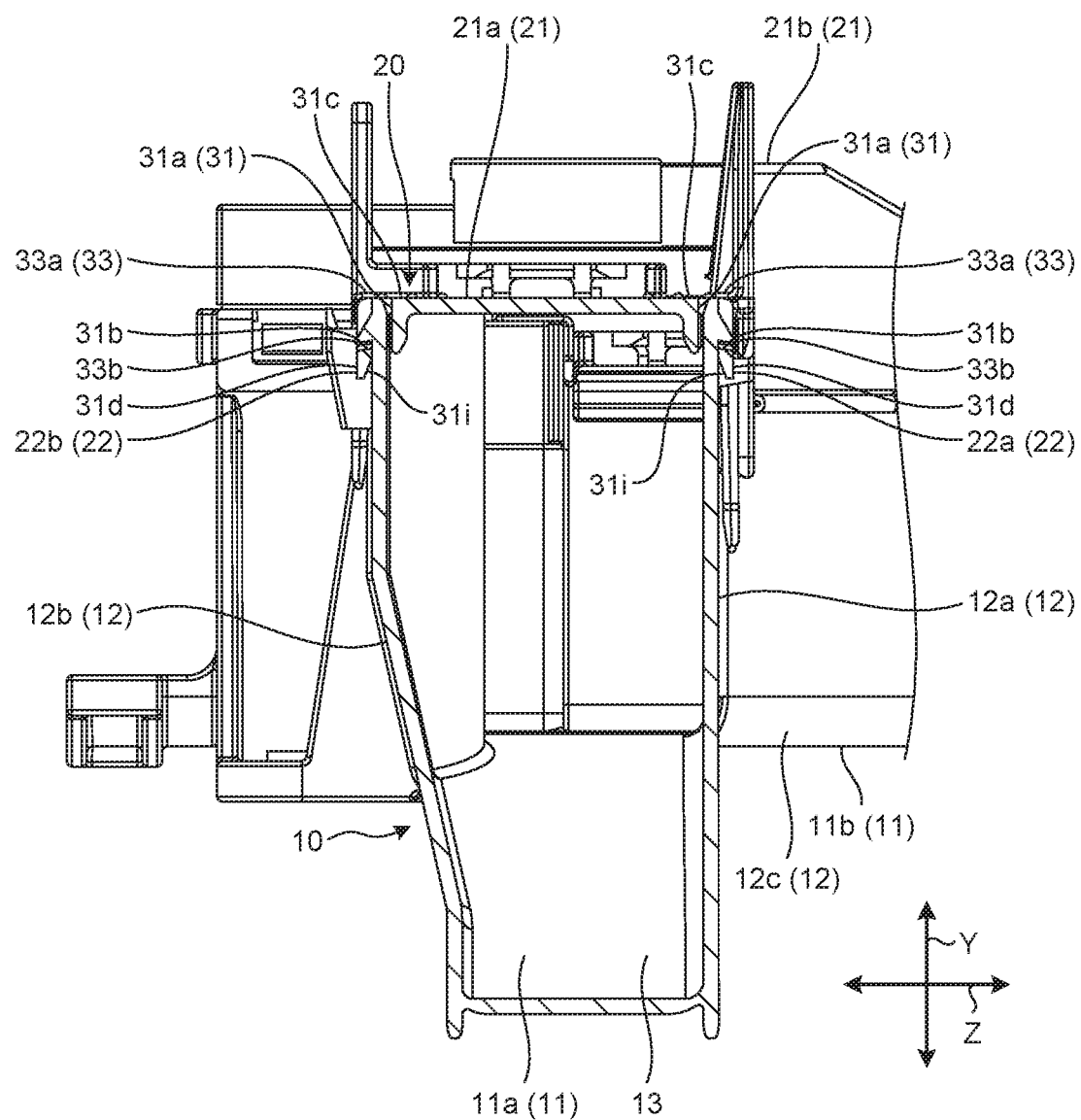
FIG. 13 is a sectional view taken in a direction of arrows XIII-XIII in FIG. 1.

When the lid member 20 further comes close to the protector main body 10, the locking lug tapered portions 33$f$ of the locking lugs 33$b$ and the side wall frame-shaped portions 31$d$ of the frame-shaped tapered portions 31$i$ come in contact with each other. When the locking lug tapered portions 33$f$ and the side wall frame-shaped portions 31$d$ come in contact with each other, the paired first opposed wall portions 12$a$, 12$b$ are elastically deformed such that the end portions 12$e$, 12$f$ on the side of the opening/closing opening 15 come close to each other. Then, when the tip end portions 33$d$ of the locking lugs 33$b$ climb over the third portions 31$g$ of the side wall frame-shaped portions 31$d$ and the locking lug portions 33 and the locking holes 31 are locked to each other as shown in FIG. 13, the paired first opposed wall portions 12$a$, 12$b$ return into original states with the end portions 12$e$, 12$f$ on the side of the opening/closing opening 15 moving away from each other and the lid member 20 is locked to the protector main body 10 in the correct position. In this state, in the protector 1, the paired guide chips 41A, 41B are kept inserted into the paired guide holes 42A, 42B as shown in FIG. 12.

When the lid member 20 is disposed in the correct position for closing the opening/closing opening 15 of the protector main body 10, the protruding chips 33$a$ and the locking lugs 33$b$ of the locking lug portions 33 are exposed from the locking holes 31 as shown in FIG. 13. Therefore, the worker can easily knows whether the lid member 20 is disposed in the correct position with respect to the protector main body 10 by visually recognizing whether the protruding chips 33$a$ or the locking lug portions 33 exist in the locking holes 31 from the one side in the height direction Y.

In the protector 1, the guide mechanisms 40A, 40B, 40C can guide the lid member 20 to the correct position for closing the opening/closing opening 15 of the protector main body 10. Besides, in guiding the lid member 20 to the correct position, if the paired first opposed wall portions 12$a$, 12$b$ are deformed, it is possible to lock the locking lug portions 33 to the locking holes 31 after correcting the deformation by use of the paired guide mechanisms 40A, 40B.

In the protector 1 and the wire harness WH1 described above, because the locking lug portions 33 are positioned at the end portions 12$e$, 12$f$ of the first opposed wall portions 12$a$, 12$b$ on the side of the opening/closing opening 15, it is possible to easily recognize the locking of the locking lug portions 33 to the locking holes 31 through the locking holes 31 from the one side in the height direction Y. In the protector 1 having such a structure, because the locking lug portions 33 in the locking mechanisms 30 are positioned at the end portions 12$e$, 12$f$ of the first opposed wall portions 12$a$, 12$b$ on the side of the opening closing opening 15, it may be difficult to lock the locking lug portions to the locking holes when the paired first opposed wall portions 12$a$, 12$b$ are deformed. However, the protruding amounts L1, L2 along the height direction Y of the paired guide chips 41A, 41B in the embodiment are set such that the insertion of the guide chips 41A, 41B into the guide holes 42A, 42B is carried out before the locking of the locking lug portions 33 to the locking holes 31. Therefore, in the protector 1 in the embodiment, it is possible to lock the locking lug portions 33 to the locking holes 31 after correcting shapes of the paired first opposed wall portions 12$a$, 12$b$ by use of the paired guide mechanisms 40A, 40B. Thus, in the protector 1, it is possible to easily recognize the locking of the locking lug portions 33 to the locking holes 31 and it is possible to easily lock the locking lug portions 33 to the locking holes 31 by use of the paired guide mechanisms 40A, 40B to properly carry out engagement even when the paired first opposed wall portions 12$a$, 12$b$ are deformed. As a result, according to the embodiment, it is possible to properly mount the lid member 20 to the protector main body 10. Especially in a case of the protector main body 10 in which the first opposed wall portions 12$a$, 12$b$ protruding in the height direction Y from the first base 11$a$ are 20 cm or higher, the first opposed wall portions 12$a$, 12$b$ may fall into or outward from the routing space 13 in the mounting of the lid member 20. However, in the protector 1 in the embodiment, even if the first opposed wall portions 12$a$, 12$b$ are fallen into or outward from the routing space 13, it is possible to lock the locking lug portions 33 to the locking holes 31 after correcting the shapes of the paired first opposed wall portions 12$a$, 12$b$ by use of the paired guide mechanisms 40A, 40B.

The protector 1 and the wire harness WH1 have the following structure. In the protector 1 and the like in the embodiment, when the lid member 20 is disposed in the correct position for closing the opening/closing opening 15, the protruding chips 33a of the locking lug portions 33 are exposed from the lid through portions 31a in the lid portion 21 of the locking holes 31 as shown in FIG. 13. Moreover, the locking lugs 33b of the locking lug portions 33 are exposed from the side wall through portions 31b in the lid side wall portions 22 of the locking holes 31. Thus, in the protector 1, it is possible to further facilitate the recognition of the locking of the locking lug portions 33 to the locking holes 31.

Furthermore, the protector 1 and the wire harness WH1 have the following structure. The paired guide holes 42A, 42B in the embodiment are adjacent to the locking holes 31 in the axial direction X in the state in which the lid member 20 is disposed in the correct position for closing the opening/closing opening 15. Therefore, the paired guide mechanisms 40A, 40B can reliably guide the locking lug portions 33 to the locking holes 31. As a result, in the embodiment, it is possible to more easily lock the locking lug portions 33 to the locking holes 31 by use of the paired guide mechanisms 40A, 40B to more properly carry out the engagement even when the paired first opposed wall portions 12a, 12b are deformed. As a result, according to the embodiment, it is possible to more properly mount the lid member 20 to the protector main body 10.

The protector 1 and the wire harness WH1 have the following structure. The paired guide holes 42A, 42B respectively include the plate-shaped portions 42c, 42d extending along the axial direction X, the support portions 42e, 42f that support the opposite end portions of the plate-shaped portions 42c, 42d, and the guide spaces 42s1, 42s2 which are positioned between the first opposed wall portions 12a, 12b and the plate-shaped portions 42c, 42d in the width direction Z and into which the guide chips 41A, 41B are inserted. The inner faces 42g, 42h of the plate-shaped portions 42c, 42d opposed to the first opposed wall portions 12a, 12b are inclined with respect to the height direction Y such that the guide spaces 42s1, 42s2 gradually widen from the side of the base 11 toward the side of the opening/closing opening 15. The width W1 along the width direction Z of the inclined inner face 42g of the one guide mechanism 40A is greater than the width W2 along the width direction Z of the inclined inner face 42g of the other guide mechanism 40B. Therefore, if the lid member 20 is turned about the tip end portion 41d of the guide chip 41B with the other guide chip 41B inserted into the guide hole 42B in the other guide mechanism 40B, the tip end portion 41c of the one guide chip 41A comes in contact with the inner face 42g of the guide hole 42A. Therefore, in the protector 1 in the embodiment, it is possible to facilitate the insertion of the one guide chip 41A into the one guide hole 42A.

Moreover, the protector 1 and the wire harness WH1 in the embodiment have the following structure. The end portion 42i of the plate-shaped portion 42d of the one guide hole 42A on the side from which the guide chip 41A is inserted is disposed closer to the opening/closing opening 15 than the end portion 42j of the p late-shaped portion 42c of the other guide hole 42B on the side from which the guide chip 41B is inserted. Therefore, in the protector 1, it is possible to minimize the length of the turning of the lid member 20 in the circumferential direction about the tip end portion 41d of the other guide chip 41B in the other guide mechanism 40B. As a result, it is possible to further facilitate the insertion of the one guide chip 41A into the one guide hole 42A.

In addition, the protector 1 and the wire harness WH1 have the following structure. In the above-described closed state, the protruding amounts L1, L2 (see FIG. 12) of the guide chips 41A, 41B along the height direction Y from the contact portions 21e, 21f of the lid member 20 that come in contact with the end portions 12e, 12f of the first opposed wall portions 12a, 12b on the side of the opening/closing opening 15 are greater than protruding amounts L3 (see FIGS. 3 and 6) of the locking lug portions 33 along the height direction Y from the end portions 12e, 12f of the first opposed wall portions 12a, 12b on the side of the opening/closing opening 15. Therefore, in the embodiment, it is possible to reliably carry out the insertion of the guide chips 41A, 41B into the guide holes 42A, 42B before the locking of the locking lug portions 33 to the locking holes 31.

The protector 1 and the wire harness WH1 have the following structure. The locking lugs 33b are provided on outer face sides (opposite sides from the routing space 13) of the first opposed wall portions 12a, 12b. Therefore, in the protector 1, it is possible to suppress reduction of a volume of the routing space 13 by the locking lugs 33b.

Furthermore, the protector 1 and the wire harness WH1 have the following structure. The paired guide mechanisms 40A, 40B are provided on the outer face sides (the opposite sides from the routing space 13) of the first opposed wall portions 12a, 12b. Therefore, in the protector 1, it is possible to suppress reduction of the volume of the routing space 13 by the paired guide mechanisms 40A, 40B.

The protector 1 and the wire harness WH1 including the nine locking mechanisms 30 have been described in the above embodiment. However, the invention is not limited to these protector 1 and wire harness WH1 and the protector 1 and the wire harness WH1 need to have at least one locking mechanism 30, for example. However, the locking mechanisms 30, when they are disposed in a pair to be opposed to each other in the width direction Z, can suppress detachment of the lid member 20 from the protector main body 10.

The protector 1 and the wire harness WH1 including the protector main body 10 having the first opposed wall portions 12a, 12b and the second opposed wall portions 12c, 12d have been described in the above embodiment. However, the invention is not limited to these protector 1 and wire harness WH1 and the protector main body 10 needs to have at least the first opposed wall portions 12a, 12b.

The protector 1 and the wire harness WH1 including the lid portion 21 having the first lid portion 21a and the second lid portion 21b and the lid side wall portions 22 having the first lid side wall portions 22a, 22b and the second lid side wall portions 22c, 22d have been described in the above embodiment. However, the invention is not limited to these protector 1 and wire harness WH1 and the lid portion 21 needs to have at least the first lid portion 21a and the first lid side wall portions 22a, 22b.

In the protector 1 and the wire harness WH1 described in the above embodiment, the protruding amount L2 from the contact portion 21e to the tip end portion 41d of the other guide chip 41B is greater than the protruding amount L1 from the contact portion 21f to the tip end portion 41c of the one guide chip 41A. However, the invention is not limited to these protector 1 and wire harness WH1 and both of the protruding amounts L1, L2 may be the same. Alternatively, the protruding amount L2 from the contact portion 21e to the tip end portion 41d of the other guide chip 41B may be smaller than the protruding amount L1 from the contact portion 21f to the tip end portion 41c of the one guide chip 41A.

Moreover, in the protector 1 and the wire harness WH1 described in the above embodiment, a shape of the one guide mechanism 40A and a shape of the other guide mechanism 40B are different. However, the invention is not limited to these protector 1 and wire harness WH1 and the paired guide mechanisms 40A, 40B may have the same shapes.

In the protector 1 and the wire harness WH1 described in the above embodiment, a position of the end portion 42*i* of the plate-shaped portion 42*d* of the one guide hole 42A and a position of the end portion 42*j* of the plate-shaped portion 42*c* of the other guide hole 42B are different in the height direction Y. However, the invention is not limited to these protector 1 and wire harness WH1 and the position of the end portion 42*i* of the plate-shaped portion 42*d* of the one guide hole 42A and the position of the end portion 42*j* of the plate-shaped portion 42*c* of the other guide hole 42B may be the same in the height direction Y.

In the protector and the wire harness according to the embodiment, because the locking lug portion is positioned at the end portion of the opposed wall portion on the side of the opening, it is possible to easily recognize the locking of the locking lug portion to the locking hole through the locking hole from one side in the protruding direction. In this structure, the protruding amounts along the protruding direction of the paired guide chips are set such that the guide chips are inserted into the guide holes before the locking lug portion is locked to the locking hole. Therefore, in the protector, it is possible to lock the locking lug portion to the locking hole after correcting shapes of the paired opposed wall portions by use of the paired guide mechanisms, for example. Thus, in the protector, it is possible to easily recognize the locking of the locking lug portion to the locking hole and it is possible to easily lock the locking lug portion to the locking hole to properly carry out engagement. As a result, according to the invention, it is possible to properly mount the lid member to the protector main body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:
   a protector main body including
      a base,
      paired opposed wall portions protruding from the base in a protruding direction and the opposed wall portions are opposed to each other along an opposed direction,
      a routing space that is formed by the base and the paired opposed wall portions and through which a wire is routed, and
      an opening that is formed by end portions of the paired opposed wall portions on a side of the main protector body that is opposite from the base and that opens in the protruding direction;
   a lid member that closes the opening;
   a locking mechanism including a locking hole that is formed in the lid member and opens in the protruding direction and a locking lug portion that is positioned at the end portion of one of the opposed wall portions on a side of the opening and that is locked to the locking hole, the locking mechanism locking the protector main body and the lid member to each other in a correct position where the lid member closes the opening; and
   paired guide mechanisms including paired guide chips respectively positioned at opposite end portions of the lid member in the opposed direction and extending along the protruding direction and paired guide holes that are respectively positioned at the end portions of the paired opposed wall portions on the side of the opening and into which the paired guide chips are respectively inserted along the protruding direction, wherein
   protruding amounts along the protruding direction of the paired guide chips are set such that the guide chips are inserted into the guide holes before the locking lug portion is locked to the locking hole, and
   the protruding amount of one of the paired guide chips is greater than the protruding amount of another of the paired guide chips along the protruding direction.

2. The protector according to claim 1, wherein
   the locking mechanism further includes another locking hole on the lid and another locking lug portion on another of the opposed wall portions, and
   each of the paired guide holes is adjacent to a respective one of the locking holes in an adjacent direction intersecting the protruding direction and the opposed direction when the lid member is disposed in the correct position for closing the opening.

3. The protector according to claim 1, wherein
   each of the paired guide holes includes a plate-shaped portion extending along an adjacent direction intersecting the protruding direction and the opposed direction, support portions that support opposite end portions of the plate-shaped portion, and a guide space that is positioned between the opposed wall portion and the plate-shaped portion in the opposed direction and into which the guide chip is inserted,
   an inner face of the plate-shaped portion opposed to the opposed wall portion is inclined with respect to the protruding direction such that the guide space gradually widens from a side of the base toward the side of the opening, and
   a width along the opposed direction of the inclined inner face of one of the paired guide mechanisms is greater than a width along the opposed direction of the inclined inner face of the other guide mechanism in the paired guide mechanisms.

4. The protector according to claim 2, wherein
   each of the paired guide holes includes a plate-shaped portion extending along an adjacent direction intersecting the protruding direction and the opposed direction, support portions that support opposite end portions of the plate-shaped portion, and a guide space that is positioned between the opposed wall portion and the plate-shaped portion in the opposed direction and into which the guide chip is inserted,
   an inner face of the plate-shaped portion opposed to the opposed wall portion is inclined with respect to the protruding direction such that the guide space gradually widens from a side of the base toward the side of the opening, and
   a width along the opposed direction of the inclined inner face of one of the paired guide mechanisms is greater than a width along the opposed direction of the inclined inner face of the other guide mechanism in the paired guide mechanisms.

5. A wire harness comprising:
   a wire having conductivity; and
   a protector through which the wire passes and the protector protects the wire, wherein the protector includes
   a protector main body having
      a base, paired opposed wall portions protruding from the base in a protruding direction and the opposed wall portions are opposed to each other along an opposed direction, a routing space which is formed by the base and the paired opposed wall portions and through which the wire is routed, and an opening that is formed by end portions of the paired opposed wall portions on a side of the main protector body that is opposite from the base and that opens in the protruding direction, a lid member that closes the opening, a locking mechanism having a locking hole that is formed in the lid member and opens in the protruding direction and a locking lug portion that is positioned at the end portion of one of the opposed wall portions on a side of the opening and that is locked to the locking hole, the locking mechanism locking the protector main body and the lid member to each other in a correct position where the lid member closes the opening, and paired guide mechanisms having paired guide chips respectively positioned at opposite end portions of the lid member in the opposed direction and extending along the protruding direction and paired guide holes which are respectively positioned at the end portions of the paired opposed wall portions on the side of the opening and into which the paired guide chips are respectively inserted along the protruding direction, and protruding amounts along the protruding direction of the paired guide chips are set such that the guide chips are inserted into the guide holes before the locking lug portion is locked to the locking hole, and the protruding amount of one of the paired guide chips is greater than the protruding amount of another of the paired guide chip along the protruding direction.

* * * * *